US011349587B2

(12) United States Patent
Gulstone et al.

(10) Patent No.: US 11,349,587 B2
(45) Date of Patent: May 31, 2022

(54) GENERATING A TIMESTAMP

(71) Applicant: Intel Corporation, Santa Clara, CA (US)

(72) Inventors: Nigel Antoine Gulstone, San Jose, CA (US); David Wolk Mendel, Sunnyvale, CA (US); Sita Rama Chandrasekhar Mallela, Penang (MY); Rajiv Dattatraya Kane, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 15/941,422

(22) Filed: Mar. 30, 2018

(65) Prior Publication Data

US 2019/0044637 A1  Feb. 7, 2019

(51) Int. Cl.
*H04J 3/06* (2006.01)
(52) U.S. Cl.
CPC ............ *H04J 3/067* (2013.01); *H04J 3/0697* (2013.01)
(58) Field of Classification Search
CPC ..................................................... H04J 3/067
See application file for complete search history.

(56) References Cited

U.S. PATENT DOCUMENTS

| 9,929,928 | B1* | 3/2018 | Dekoos | H04L 43/0852 |
| 10,467,310 | B1* | 11/2019 | Dey | H04L 63/102 |
| 2004/0076187 | A1* | 4/2004 | Peled | H04J 3/0685 370/514 |
| 2013/0132532 | A1* | 5/2013 | Zhang | H04L 63/0218 709/220 |
| 2014/0043992 | A1* | 2/2014 | Le Pallec | H04L 43/0852 370/252 |
| 2014/0092918 | A1* | 4/2014 | Jost | H04J 3/0697 370/465 |

\* cited by examiner

*Primary Examiner* — Kodzovi Acolatse
*Assistant Examiner* — Abdeltif Ajid
(74) *Attorney, Agent, or Firm* — Compass IP Law PC

(57) ABSTRACT

Particular embodiments described herein provide for an electronic device that can be configured to determine that a packet needs a timestamp, determine an initial timestamp for a reference block, communicate the reference block to a monitor engine, receive an asynchronous pulse from the monitor engine after the monitor engine received the reference block, determine a synchronization timestamp for the asynchronous pulse, and determine the timestamp for the packet based on the initial timestamp for the reference block and the synchronization timestamp for the asynchronous pulse.

21 Claims, 13 Drawing Sheets

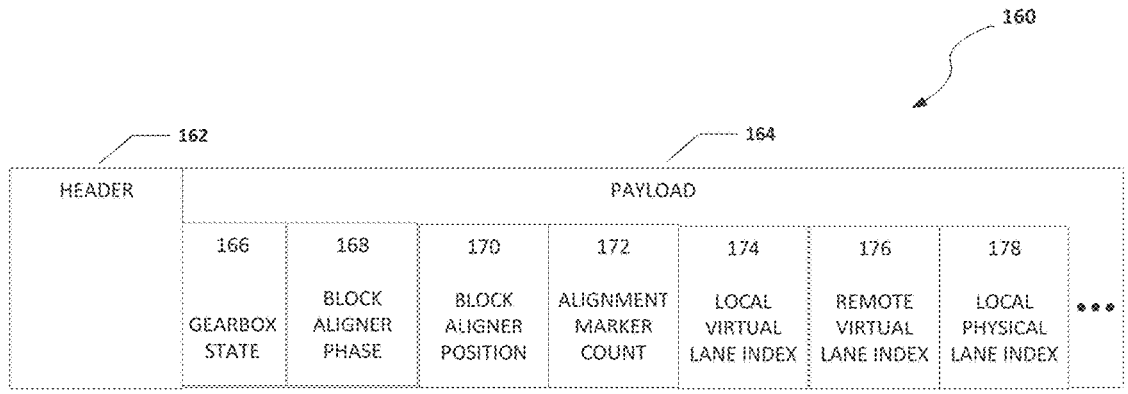

FIGURE 7

| data[255:192] | data[191:128] | data[127:64] | data[36:0] |
|---|---|---|---|
| AM3: TAM[3]+vl_offset[3] | AM2: TAM[2]+vl_offset[2] | AM1: TAM[1]+vl_offset[1] | AM0: TAM[0]+vl_offset[0] |
| AM7: TAM[7]+vl_offset[7] | AM6: TAM[6]+vl_offset[6] | AM5: TAM[5]+vl_offset[5] | AM4: TAM[4]+vl_offset[4] |
| AM11: TAM[11]+vl_offset[11] | AM10: TAM[10]+vl_offset[10] | AM9: TAM[9]+vl_offset[9] | AM8: TAM[8]+vl_offset[8] |
| AM15: TAM[15]+vl_offset[15] | AM14: TAM[14]+vl_offset[14] | AM13: TAM[13]+vl_offset[13] | AM12: TAM[12]+vl_offset[12] |
| AM19: TAM[19]+vl_offset[19] | AM18: TAM[18]+vl_offset[18] | AM17: TAM[17]+vl_offset[17] | AM16: TAM[16]+vl_offset[16] |
| VL3: AM3 + 1*330*RX_UI | VL2: AM2 + 1*330*RX_UI | VL1: AM1 + 1*330*RX_UI | VL0: AM0 + 1*330*RX_UI |
| VL7: AM7 + 1*330*RX_UI | VL6: AM6 + 1*330*RX_UI | VL5: AM5 + 1*330*RX_UI | VL4: AM4 + 1*330*RX_UI |
| VL11: AM11 + 1*330*RX_UI | VL10: AM10 + 1*330*RX_UI | VL9: AM9 + 1*330*RX_UI | VL8: AM8 + 1*330*RX_UI |
| VL15: AM15 + 1*330*RX_UI | VL14: AM14 + 1*330*RX_UI | VL13: AM13 + 1*330*RX_UI | VL12: AM12 + 1*330*RX_UI |
| VL19: AM19 + 1*330*RX_UI | VL18: AM18 + 1*330*RX_UI | VL17: AM17 + 1*330*RX_UI | VL16: AM16 + 1*330*RX_UI |
| VL0: AM0 + 2*330*RX_UI | VL0: AM0 + 2*330*RX_UI | VL0: AM0 + 2*330*RX_UI | VL0: AM0 + 2*330*RX_UI |

GENERATING A TIMESTAMP

TECHNICAL FIELD

This disclosure relates in general to the field of computing and/or networking, and more particularly, to generating a timestamp.

BACKGROUND

Emerging network trends in data centers and cloud systems place increasing performance demands on a system. The increasing demands can cause an increase of the use of resources in the system. The resources have a finite capability and each of the resources need to be managed. One factor is managing resources is the ability to generate an accurate timestamp.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 7 is a block diagram of a packet illustrating example details of generating a timestamp, in accordance with an embodiment of the present disclosure;

FIG. 8 is a block diagram of a table illustrating example details of generating a timestamp, in accordance with an embodiment of the present disclosure;

The FIGURES of the drawings are not necessarily drawn to scale, as their dimensions can be varied considerably without departing from the scope of the present disclosure.

DETAILED DESCRIPTION

Example Embodiments

The following detailed description sets forth examples of apparatuses, methods, and systems relating to a system, method, apparatus, etc. for generating a timestamp, in accordance with an embodiment of the present disclosure. Features such as structure(s), function(s), and/or characteristic (s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
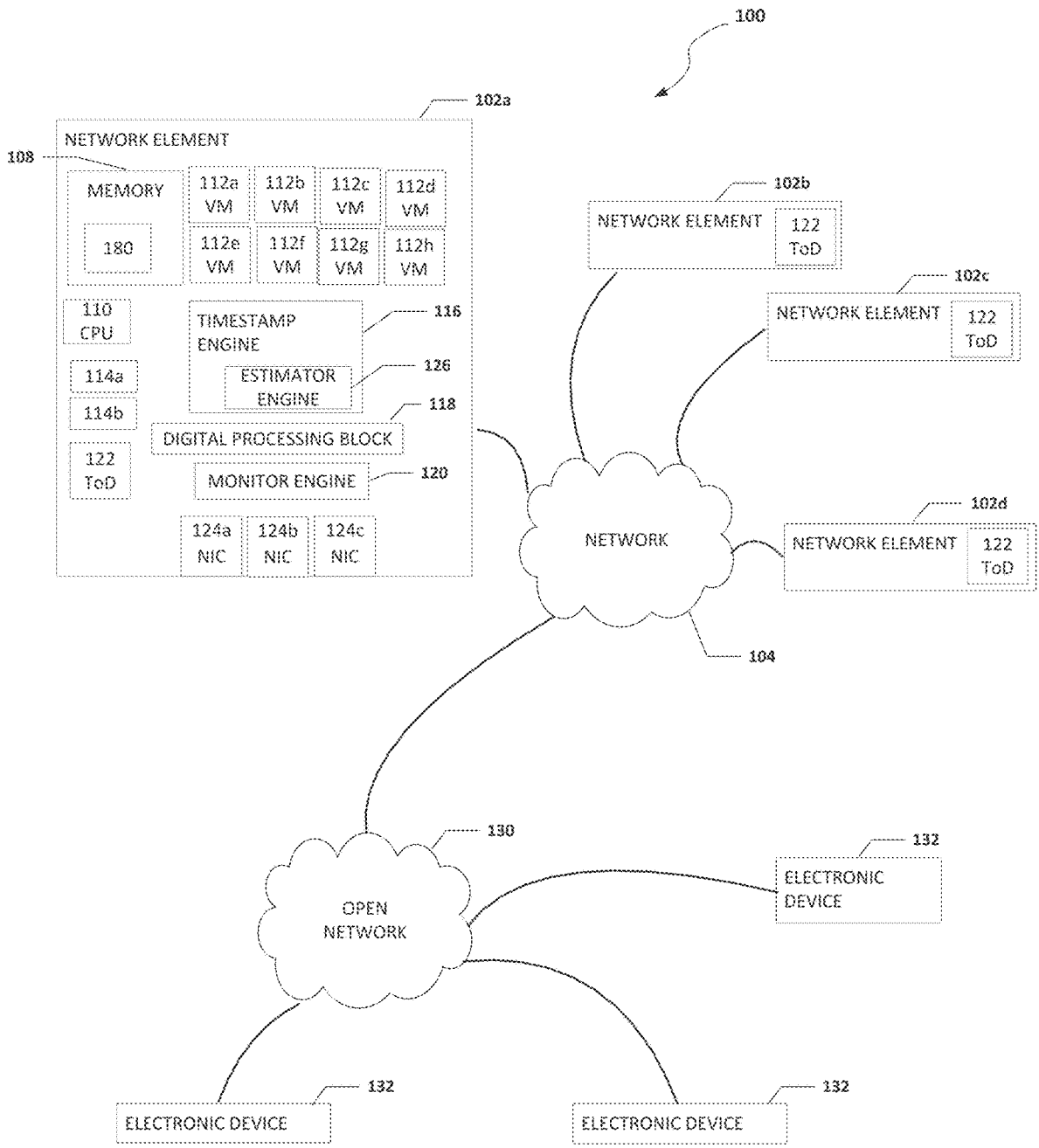
FIG. 1 is a block diagram of a system to enable generating a timestamp, in accordance with an embodiment of the present disclosure.

FIG. 1 is a simplified block diagram of a system configured to enable generating a timestamp, in accordance with an embodiment of the present disclosure. In an example, a system 100 can include one or more network elements 102a-102d. Each network element 102a-102d can be in communication with each other using network 104. In an example, network elements 102a-102d and network 104 are part of a data center. Network elements 102a-102d can each include their own time of day (ToD) 122. One or more ToDs 122 may be a grandmaster clock and each ToD 122 may have a different time associated with it.

Each network element 102a-102d can include memory, a processor, a timestamp engine, a plurality of virtual machines, one or more processes, a digital processing block, a monitor engine, and one or more network interface controllers (NICs). For example, network element 102a can include memory 108, a processor 110, a plurality of virtual machines 112a-112h, one or more processes 114a and 114b, a timestamp engine 116, a digital processing block 118, a monitor engine 120, and one or more NICs 124a-124c. Memory 108 can include a timestamp table 180. Timestamp engine 116 can include an estimator engine 126. Estimator engine 126 can be configured to calculate a timestamp on the receiving path as the timestamp is for a time that is the past and to estimate the timestamp on the transmitting as the timestamp is for a time that is in the future.

Processor 110 may be a central processing unit (CPU). Each process 114a and 114b may be a process, application, function, virtual network function (VNF), etc. Digital processing block 118 is an electronic device or component or group of electronic devices or components configured to process, organize, realign, etc. data as it is communicated to and from network element 102a. Digital processing block 118 can include one or more first-in-first out (FIFO) blocks, gearboxes, forward error correction (FEC) blocks, Reed Solomon FEC (RSFEC) blocks, media access control security (MACsec) blocks, physical coding sublayer (PCS) blocks, and/or other logic, blocks, and/or subcomponents that make the latency of the data path difficult to predict between the point of timestamp prediction and the point of packet exit. Network 104 can be in communication with open network 130 (e.g., the Internet). Open network 130 can be in communication with electronic devices 132. Electronic devices 132 may be user equipment, cloud services, or some other type of electronic device that is in communication with network 104 through open network 130.

It is to be understood that other embodiments may be utilized and structural changes may be made without departing from the scope of the present disclosure. Substantial flexibility is provided by system 100 in that any suitable arrangements and configuration may be provided without departing from the teachings of the present disclosure. Elements of FIG. 1 may be coupled to one another through one or more interfaces employing any suitable connections (wired or wireless), which provide viable pathways for network (e.g., network 104, etc.) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

For purposes of illustrating certain example techniques of system 100, the following foundational information may be viewed as a basis from which the present disclosure may be properly explained. End users have more media and communications choices than ever before. A number of prominent technological trends are currently afoot (e.g., more computing devices, more online video services, more Internet traffic), and these trends are changing the media delivery landscape. Data centers serve a large fraction of the Internet content today, including web objects (text, graphics, Uniform Resource Locators (URLs) and scripts), downloadable objects (media files, software, documents), applications (e-commerce, portals), live streaming media, on demand streaming media, and social networks. In addition, devices and systems, such as data centers, are expected to increase performance and function. However, the increase in performance and/or function can cause bottlenecks within the resources of the system and electronic devices in the system. One of the components of managing a system is a timestamp. However, providing an accurate timestamp throughout the system can be difficult.

The IEEE 1588 protocol allows nodes in a network to synchronize themselves to a single clock hosted by one of the nodes in the network so that all the nodes can share the same notion of time or the ToD. IEEE 1588 is a protocol designed to add network synchronization features to networks that are not intrinsically synchronous. In a non-synchronous network, each node in the network (e.g., a VM, and/or network element) can have its own notion of time, making it difficult to perform operations across different nodes where having events occur in a specific order or at specific times is critical.

A critical part of the IEEE 1588 protocol is the ability to produce egress timestamps. The term "egress timestamps" includes the timestamps for packets as they are transmitted from one node to another. Egress timestamps indicate the time that a bit in the packet being transmitted (the reference bit), specified in the IEEE 1588 standard, crosses a reference plane (typically defined at the time at which the serial output pin of the network element that includes the node switches to the value of the bit). The times used for the timestamps are based on a local ToD clock, meaning that the time being used is the time of the local ToD clock when the reference bit crosses the reference plane.

A virtualized hardware platform can have multiple virtual machines running on it with each one providing independent services to users. If those services include time sensitive services, (for example IEEE 1588 Precision Timestamp Protocol (PTP) operations for Time Sensitive Networking), then PTP timestamp offload functions must also be virtualized. One part of PTP timestamping is using a ToD clock as a source of the times used in each timestamp. If the virtual lanes on the physical system are not synchronized to the same grandmaster clock, then PTP timestamps must be able to select between multiple ToDs from packet-to-packet to generate the correct timestamp for the virtual machine associated with the packet.

Another critical part of the IEEE 1588 protocol is the ability to produce ingress timestamps. The term "ingress timestamps" includes timestamps for packets as they are received at a node. Ingress timestamps indicate the time at which the reference bit from each packet crossed the reference plane, in terms of the local copy of the ToD. As with egress timestamps, measuring timestamps is easiest when the packet can be clearly read (not scrambled, misaligned, or encoded).

However, measuring an accurate arrival time is easiest when it is done as close as possible to the reference plane. Measuring timestamps at the reference plane can be difficult because the data at the reference plane is typically serialized and for modern Ethernet BASE-R channels, the data is scrambled and running at multi-gigabit rates. For this reason, most timestamps are actually generated when the reference bit crosses a point in the egress data path feeding the serial output (commonly referred to as the prediction plane), rather than at the serial output itself. The accuracy of the timestamp then depends on the ability to predict when the reference bit will reach the reference plane, instead of by direct measurement.

Timestamp predictions are easiest to implement when the reference bit can be detected in a non-scrambled section of the data path and when the latency between the prediction plane and the reference plane is known and constant. Unfortunately, keeping the latency between the prediction plane and the reference plane constant can lead to costly tradeoffs in some designs. In some Ethernet channels, several issues are present that prevent the use of fixed latency. For example, some Ethernet channels use an overclocked architecture where the flow resulting from the clock rate multiplied by the data path width is larger than the flow from the serial pin. The channels typically use data_valid deassertion to keep the flow balanced so that data is not lost but this means that latency is difficult to determine and predict. In addition, typically, the flow of data from the main data path to the section of the data path that feeds a serializer goes through an asynchronous FIFO, whose occupancy fluctuates over time. Because the occupancy changes, the latency through the FIFO also varies which can make the latency difficult to predict. Further, often a data_valid pattern is not constant as the rate balance is typically supported between unrelated clocks where the data_valid pattern is modulated to maintain the occupancy of an asynchronous FIFO between a low and high watermark. This can exacerbate the problem of not knowing the latency through the asynchronous FIFO and make the latency even more difficult to predict.

Some Ethernet channels include optional components that modulate the data_valid pattern to support internal gearbox functions or functions where data is changed from a first number of data paths to a second number of data paths (e.g., four data paths to one data path) and/or a first data path with a first bitrate to a second data path with a second bitrate (e.g., from 64b to 66b data). An illustrative example of this is a RSFEC block because the RSFEC block increases the unpredictability of the latency between the prediction plane and the reference plane. An additional complication is caused by the fact that the ToD clock used to generate timestamps must be shared by multiple modules and is thus located on a main FPGA die or main fabric, which is a separate silicon die from the one where the Ethernet channel may be implemented. This introduces an asynchronous boundary with a time-varying delay that must be measured between the ToD clock and the timestamp circuit.

One current solution to the problem of generating egress timestamps in an Ethernet channel includes a 2-step timestamp that can be generated using a data path with predictable latency, or the chosen plane of reference (the point in the data path where the timestamp must be generated) is monitored to determine the appropriate timestamp for packets leaving the device. A 2-step timestamps means that a timestamp is generated for the packet of interest and the generated timestamp is transmitted in a subsequent packet.

Another current solution to the problem of generating egress timestamps in an Ethernet channel that includes a 1-step timestamp. A 1-step timestamp means that a timestamp is generated for the packet of interest and the generated timestamp is transmitted in the packet of interest for which it was produced. The 1-step timestamp can be generated using a data path with predictable latency where the time at which the packet will exit or leave the device after the timestamp is inserted is estimated. The predictable latency is dependent on the data path latency between the point at which the timestamp is produced and when the packet exits or leaves the device. A 1-step timestamp can be produced with slightly reduced accuracy using a timestamp prediction for a data path that is mostly predictable, with some portions that have a latency that can be measured and kept as a fixed latency after measurement. An example of this type of mostly predictable latency is where part of the data path includes an asynchronous FIFO whose occupancy can change at startup but stays the same after startup.

However, the current 1-step and 2-step solutions to the problem of generating egress timestamps in an Ethernet channel become less accurate as the latency of the data path become less predictable. Some practical sources of unpredictability include asynchronous crossings in the data path, modules in the data path that use different clock rates (e.g. RSFEC), overclocked architectures that include channels where the clock used is faster than the clock required for the actual flow of data and flow balance is maintained using data_valid, architectures with difficult to measure phase relationships between asynchronous clocks (e.g. S10 transceiver tile architecture where data is transmitted source-synchronously from a main die to a daughter die), etc.

Ingress timestamps for IEEE 1588 over Ethernet links are typically generated by detecting a bit position specified by the IEEE 1588 standard (commonly referred to as the reference bit) at some point in the ingress data path, then estimating when that reference bit crossed the reference plane. The reference plane is a point in the ingress data path that is chosen as the point where timestamps must be generated and is typically the ingress serial pin of the device.

Because detection of packets is difficult at the serial pin, the point where ingress timestamps are estimated is usually at some point later in the ingress data path. Some current solutions decode the packet, determine the position of the reference bit, and then estimate the ingress timestamp by taking the current ToD (the time according to the local IEEE 1588 clock) and subtracting a time corresponding to a fixed latency through the ingress data path.

In addition, other current solutions create multilane ingress timestamps using fixed latency data paths and typically, each data path determines one particular way to choose the appropriate delay for a packet that arrived using multiple independent transceivers. Solutions that depend on a fixed latency force expensive tradeoffs in the ingress data path. When using a fixed latency, asynchronous crossings in the data path must be avoided, and when they are used, the latency through the asynchronous crossings must be measured or predicted to avoid a loss of accuracy. Also, when using a fixed latency, modules in the data path that use different clock rates, have varying latency, or vary data_valid (e.g. RSFEC) must be avoided. In addition, overclocked architectures or channels where the clock used is faster than the clock required for the actual flow of data, and flow balance is maintained using data_valid need to be avoided, since they cause varying latency that can be different than the fixed latency. Some architectures have a difficult to measure phase relationships between asynchronous clocks (e.g., an S10 transceiver tile architecture where data is transmitted source-synchronously from a main die to a daughter die) and it can be difficult to accurately determine a fixed latency.

What is needed is a a way to accurately generate an egress timestamp and/or to accurately generate an ingress timestamp. A device to help with accurately generating and egress timestamp and/or accurately generating an ingress timestamp, as outlined in FIG. 1, can resolve these issues (and others). In an example, system 100 can be configured to generate accurate egress timestamps for the IEEE 1588

Precision Timing Protocol in an Ethernet channel that uses data_valid and has asynchronous crossings and subcomponents (e.g. digital processing block 118) that make the latency of the data path difficult to predict. Also, system 100 can be configured to allow for switching between ToD clocks while generating 1-step timestamps and 2-step PTP timestamps. In an example, timestamps are generated using one clock, then converted to the second clock by subtracting the difference in time between the two clocks.

1-step timestamps send egress timestamps in the packet that is being timestamped. In this case the estimator engine (e.g., estimator engine 126) must provide the egress timestamp to an internal circuit that writes the timestamp into the packet as it is transmitted. 1-step timestamps are supported in system 100 because an estimator engine can produce accurate timestamp predictions based on the reference block as early as needed in the egress data path. 2-step timestamps send egress timestamps in a separate packet that follows the packet being timestamped. To support 2-step timestamping, the estimator engine sends the egress_timestamps it generates to the fabric, where they can be incorporated into follow-on packets.

In an example, a monitor engine (e.g., monitor engine 120) can be configured to recognize a sideband control bit that marks valid cycles of data in the data path as being a reference block and generate an asynchronous pulse that is passed directly to the fabric using carefully balanced wires with low delay variation. The monitor engine is located in the egress data path after digital processing block 118 (e.g., an asynchronous FIFO, a RSFEC block, and/or a gearbox module) used to change from 66b to 64b data. As a result, the latency between the monitor engine and the reference plane is fixed and constant, and data validity is constantly high. Because the monitor engine follows the gearbox, there are some limits on the period between reference blocks. In an example, a period can be used that ensures the reference block always coincides with the same state in the gearbox, which is always moving through a fixed set of states to determine which bits from the 66b data path can be moved to the 64b data path.

This allows system 100 to include a means of generating PTP timestamps using the data from the monitor engine. More specifically, the asynchronous pulse from the monitor is sampled in the fabric when the signal transitions (e.g., goes from low to high or from high to low), and a time from the ToD clock is assigned to the transition. The estimator engine, responsible for generating timestamps, keeps track of the most recent block that was marked as a reference block and the number of valid bits that have been transmitted since the reference block was transmitted. After the monitor engine, data_valid is always high, and the system can count the number of valid bits between the reference block and any specific reference bit. Using the number of valid bits between the reference block and any specific reference bit, the system can calculate how much time there was on the serial line between bit 0 of the reference block and the reference bit. As a result, the system can determine that the egress time of the reference bit is:

$$egress\_time = TAM + bits * TX\_UI$$

TAM is the timestamp for the most recent reference block, corrected for error and the fixed latency from the monitor to the reference plane, bits is the number of bits between the reference block corresponding to TAM and the current reference bit. Note that depending on the type of channel, additional processing can be applied to account for striping or other functions that adjust bit position. TX_UI is the time it takes to send one bit on the serial line.

The estimator engine is loaded with TX_UI from the timestamp engine and is periodically loaded with a new value for TAM. When a TAM value is loaded, it is assigned to the most recently transmitted reference block. When a new reference block is transmitted, there is some time before a new TAM value will be ready to load from the fabric to the estimator engine. During this time, the estimator engine uses the TAM from the previous reference block, plus the number of bits transmitted since the previous reference block to estimate egress timestamps. The amount of time the system can wait before loading a new timestamp depends on the numerical accuracy of TX_UI and the egress_timestamp calculation.

This allows the system to sidestep most of the issues that make timestamp estimation difficult. For example, because the monitor engine operates in the section of the data path where data_valid is always high, it is not affected by overclocking. The estimator engine is also unaffected, because it only counts bits in valid cycles. In addition, because the monitor engine creates a timestamp on data after it passes through the asynchronous FIFO, it is not affected by changes to the FIFO occupancy. Regarding a varying data_valid pattern, again, the monitor engine is in the section of the data path where data_valid is always high and is relatively unaffected by changes to the data_valid pattern. Regarding the issue of optional components with unpredictable latency, the components do not present a significant issue because the monitor engine is later in the data path than the source of latency variation and this protects the timestamp from the optional components with unpredictable latency. The ToD clock on a different die issue is limited by the fact that once the ToD is captured for the asynchronous pulse, the measurements are no longer time critical and are no longer affected by the crossing to a die with a different ToD. Also, changes can be tracked due to temperature by sending reference blocks periodically and there are several solutions available to minimize the error due to the asynchronous path and sampling the data from the asynchronous path.

Timestamps for reference blocks (TAMs) are generated with reference to each of the ToD clocks for a plurality of VMs (one per-virtual system) and the TAM associated with a specific virtual clock is always loaded before executing egress timestamp commands for a packet from a given VM. System 100 can be configured to generate timestamps that are referenced to a ToD clock chosen on a per packet basis. This in turn allows the same Ethernet channel to be used for PTP traffic from a variety of independent ToD clocks, enabling virtualization of the link.

Also, system 100 can be configured to calculate egress timestamps using reference blocks. Where TAM is a timestamp for a reference block measured accurately using a monitor engine embedded in a section of the data path where the latency between its measurement and the serial pin (commonly used as the reference plane for egress timestamps) is fixed and known. In the reference block method of calculating timestamps, TAM is calculated using a single PTP ToD clock residing in its own clock domain where a signal from the monitor engine indicates that the reference block sideband signal was detected by the monitor and is captured and used to generate a timestamp for the reference block with respect to that single clock.

System 100 can be configured to be able to support timestamps using up to N−1 other ToD clocks. After the TAM is calculated, a TAM for the same block is calculated using each of the other ToD clocks as a reference by subtracting the time of the original clock, then adding the corresponding time for the other clocks. TAM loading is performed through an interface and the pins of the interface are shared with other interfaces. This can cause limitations on when TAMs can be loaded and alternate implementations could use a totally separate interface that would avoid these limitations.

To virtualize the ToD, a TAM is loaded that is referenced to the desired ToD before performing any timestamp operations that require that ToD. In the example, a TAM referenced to ToD[0] is loaded, then a PTP egress timestamp (either 1-step or 2-step) is requested using a PTP command to the estimator engine for ToD[0]. A TAM referenced to TOD[1] is loaded, followed by a PTP egress timestamp command for TOD[1]. The process of switching contexts between ToD clocks can be used for an arbitrary number of ToD clocks, so long as TAM can be converted from the ToD clock used to capture the original TAM of the reference block to any other ToD of interest. The system is generally able to generate a sufficiently accurate corresponding time for each ToD clock because while the clocks are tracking different ToD values, if they are sharing the same channel they are usually being clocked by the same reference clock. Because the typical time limit for a TAM load is about 80,000 clock cycles, as long as the conversions can be performed correctly, the system can take its time performing the TAM calculations and delay the loading of TAM. This means that TAM conversions can be performed using slower calculation methods. For example, TAM conversions can be performed using a microprocessor, and the results stored in memory until they are needed.

It is important that the ToD be accepted by the estimator engine before it processes any packets. In an example, because ports in an interface may be shared with the TAM loading interface and because the delays for TAM loads and PTP commands to the estimator engine are not matched, pacing between PTP commands that use different ToD clocks may be required to be spaced far enough apart so that the system can be sure that the new ToD required for each command has been loaded and to ensure that the system does not load a new ToD to the estimator engine before the estimator engine is finished generating a timestamp for the current packet. By using a balanced delay, the delay between TAM loads and new PTP commands can be made arbitrarily small. Another way to speed up switching between TAMs is to load all of the TAMs required to a lookup table (e.g., timestamp table 180) inside the estimator engine then provide the estimator engine a select signal along with each command to choose the appropriate TAM from the lookup table.

System 100 can also be configured to generate accurate ingress timestamps for the IEEE 1588 Precision Timing Protocol in an Ethernet channel that uses data_valid and has asynchronous crossings and subcomponents (e.g. digital processing block 118) that make the latency of the data path difficult to predict. In addition, system 100 can be configured to generate accurate ingress timestamps for the IEEE 1588 Precision Timing Protocol in a multilane Ethernet channel with varying numbers of virtual lanes that can be aligned, re-ordered, and de-skewed separately. This allows different means of timestamping to be applied by re-programming the offset registers to accommodate common means of timestamping with multi-lane RSFEC blocks and to allow for common means of accounting for multi-lane bonding. System 100 can be configured to add capabilities that are required for dealing with multi-lane Ethernet channels that use bonding with virtual lanes (as required for 40G, 50G, and 100G Ethernet links), and allow for channel bonding to be decided at run-time in software.

In an example, the arrival of specifically marked blocks of data at a point can be indicated or marked at or very near to the reference plane (e.g. monitor engine 120) with a means of predicting timestamps based on the relative position of the packets that need timestamps to a small set of blocks that are specially marked. The latency of the data path between the monitor engine and the reference plane is fixed and the timestamp engine can keep track of the number of bits transmitted between each reference block and subsequent blocks that need timestamps. The monitor engine produces an asynchronous pulse which is used to generate a timestamp using a ToD clock that can be synchronized to a grandmaster clock. The timestamp is assigned to the reference block and packets that occur after the reference are given a timestamp that is the reference block time plus the time required to transmit the bits between the reference block and the bit that needs timestamping. System 100 can be used for channels with multiple asynchronous crossings, overclocked architectures, and functional blocks with unpredictable latency. This is particularly valuable for future Ethernet channels with features like RSFEC and MACsec, where the normal methods for making a channel have predictable latency may be too costly.

System 100 can be configured to mark blocks of data received from the monitor engine (e.g. monitor engine 120) as reference blocks and communicate the reference blocks on a sideband signal that travels with the data as it travels through the ingress data path. An asynchronous signal can be routed to the fabric or a section where the ToD clock is implemented (e.g., a separate FPGA die). The estimator engine can keep track of the number of valid bits received between the most recent reference block and each reference bit. The latency of the data path between the reference plane and the monitor engine is fixed and the asynchronous pulse is used to generate a timestamp for the reference block based on the ToD, corrected for errors in the measurement path, and the fixed delay from the reference plane to the monitor engine. The resulting timestamp is combined with the bit count multiplied by the time per bit to calculate the timestamp of the reference bit. In an example, arbitrary blocks can be chosen to be reference blocks. In another example, special symbols from the Ethernet protocol can be selected to be reference blocks (for example, FEC alignment markers). This can be used for channels with multiple asynchronous crossings, overclocked architectures, and functional blocks with unpredictable latency. This is particularly valuable for Ethernet channels with features like RSFEC and MACsec, where the normal methods for making a channel have predictable latency may be too costly.

When operating on ingress data, the monitor engine can periodically produce a sideband signal marking a cycle of data as a reference block and at the same time, generate an asynchronous pulse that is passed directly to the estimator engine using carefully balanced wires with low delay variation. The monitor engine is located in the ingress data path before the digital processing block 118 (e.g., an asynchronous FIFO, RSFEC block, and gearbox module, etc.) so the latency between the monitor engine and the reference plane is fixed and constant and data_valid is constantly high.

Because the monitor engine is before a gearbox, there can be some limits on the period between reference blocks. In an example, a period can be used that ensures the reference block always coincides with the same state in the gearbox, which is always moving through a fixed set of states to determine which bits from the 66b data path can be moved to the 64b data path. The monitor engine can operate in two modes. In one mode, the monitor engine uses a free-running counter to pick arbitrary blocks of data to be reference blocks at the chosen period. In a second mode, the monitor engine does the same, but the relationship between the asynchronous pulse and the reference block is adjusted so that the resulting asynchronous pulse corresponds to the start of an Ethernet RSFEC block. In the second mode, the monitor engine can shift the position of the reference block marker so that it lands on the corresponding RSFEC alignment block.

PTP timestamps can be generated using the data from the monitor engine. The asynchronous pulse from the monitor engine is sampled by the estimator engine. When the signal transitions (goes from low to high or from high to low), the signal can be captured as precisely as possible, and assigned a time from the ToD clock to the transition. The estimator engine, (the circuit responsible for generating timestamps), can keep track of the most recent block that was marked as a reference block and the number of valid bits that have been received since the reference block was received. Before the monitor engine, data_valid is always high, so if the number of valid bits between the reference block and any reference bit are counted, the system can calculate how much time there was on the serial line between bit zero of the reference block and the reference bit. As a result of this property, the ingress time of the reference bit is:

$$\text{ingress\_time} = \text{TAM} + \text{offset} + \text{bits} * RX\_UI$$

TAM is the timestamp for the most recent reference block, corrected for error and the fixed latency from the monitor engine to the estimator engine, offset is a time corresponding to the number of bits of shift that are applied to incoming data for word alignment, bits is the number of bits between the reference block corresponding to TAM and the current reference bit. Note that depending on the type of channel, additional processing can be applied to account for striping or other functions that adjust bit position. RX_UI is the time it takes to receive one bit on the serial line. To improve accuracy, the recovered clock period can be measured using the ToD clock to determine the actual RX_UI. In most cases, however, any error due to parts per million (ppm) offset is small enough to be ignored.

The estimator engine is loaded with RX_UI and is periodically loaded with a new value for TAM. When a TAM value is loaded, it is assigned to the most recently received reference block. When a new reference block is received, the signal used to calculate TAM has usually already arrived. Nevertheless, if there is a delay in loading the new TAM, the estimator engine uses the TAM from the previous reference block, plus the number of bits received since the previous reference block to estimate ingress timestamps. The amount of time that can pass before a new timestamp must be loaded depends on the numerical accuracy of RX_UI, the ppm offset of the remote clock, and the ingress_timestamp calculation. To improve numerical accuracy, the ppm offset can be improved using specific hardware to recover the remote clock and use it locally, or by forwarding the clock of the remote node.

This allows the system to sidestep most of the issues that make timestamp estimation difficult. For example, because the monitor engine operates in the section of the data path where data_valid is always high, it is not affected by overclocking. The estimator engine is also unaffected, because it only counts bits in valid cycles. In addition, because the monitor engine creates a timestamp on data before it passes through the asynchronous FIFO, it is not affected by changes to the FIFO occupancy. Regarding the issues caused by a varying data_valid pattern, the monitor engine is in the section of the data path where data_valid is always high and is unaffected by changes to the data_valid pattern. Regarding optional components with unpredictable latency, the monitor engine being earlier in the data path that the source of latency variation protects the timestamp from its effects. Once the ToD for the asynchronous pulse is captured, measurements are no longer time critical and are no longer affected by the crossing issue of a ToD clock on a different die. Changes due to temperature can be tracked by sending reference blocks periodically, and there are several solutions available to minimize the error due to the asynchronous path and sampling the data from the asynchronous path.

In an example, the system can be configured to capture the state of the RX PCS alignment logic as reference blocks arrive, calculate the individual delays the alignment block applies to data in each virtual lane used in the interface, and add a set of programmable lookup registers to hold per-virtual lane offset values so that the individual delays for each virtual lane can be applied depending on which virtual lane is used by each incoming reference bit. Because the offset lookups are programmable at run-time, they can be adjusted to implement different methods of accounting for channel bonding. The offsets can be programmed with precise offset data for each virtual lane and combined with precise TAMs collected from each physical lane in the channel so that each reference bit is marked with the exact time it arrived at whichever serial pin the reference bit used. The offsets can be programmed with an average delay value corresponding to a virtual reference plane inside the device after delays have been applied to deskew all the lanes and combined with a TAM that indicates the time for the deskewed set. The system can be used with multi-lane channels, with or without RSFEC, using multiple means of accounting for channel bonding. This allows the system to provide a high-accuracy multi-lane solution that includes RSFEC and is flexible to account for the fact that the IEEE 1588 standards body has not given conclusive guidance on the way to deal with multi-lane channels.

Further, the system can be configured to extract the data needed to generate offset values for individual virtual lanes without adding a large number of hardware sideband signals by calculating ingress timestamps using reference blocks. More specifically, the monitor engine in the ingress data path marks selected blocks of data as reference blocks, uses the ingress serial pin as the reference plane, and calculates the time at which the reference bit in each ingress packet crossed the reference plane by calculating a timestamp for the most recent reference block using an asynchronous pulse from the monitor engine to generate a timestamp for the reference block and by adding the time between the reference block and the reference bit to the timestamp to generate an ingress timestamp.

Multilane Ethernet channels are used for 40G, 50G, 100G, and other high throughput Ethernet links. They combine the input of several serial transceivers using channel bonding to add delay to data arriving from each individual channel, and lane re-ordering to put the data from the channels into the same order it was in when it was transmitted. The protocols for multilane Ethernet channels includes the concept of virtual lanes, which is a way of grouping blocks of data to travel over the multiple physical lanes in a way that it can be re-ordered and deskewed. The Ethernet standard requires receivers to de-interleave virtual lane data from physical lanes, then align, deskew, and re-order the virtual lanes separately before combining them. Multilane channels introduce a new set of issues for the reference block method of timestamping.

One problem is that the IEEE 1588 specification is not clear about how to define the reference plane for a multilane channel. Skew between channels can create unusual situations. For example, in the case where the skew between two transceivers that are part of the channel is greater than the time it takes to receive a minimum sized PTP message. If the first packet's reference bit arrives on the delayed lane, while the second packet arrives on the lane without skew, the timestamps will indicate that the second packet arrived before the first packet. Whether this is correct, given that the data for both packets was delayed inside the ingress data path so that the bits would be processed in the correct order is a matter of debate. In addition, because each virtual lane is aligned and deskewed separately, and then re-ordered, the delay for bits coming from each of the serial ingress pins to the estimator engine will be different depending on which virtual lane it is in. Furthermore, the delays are all data dependent and can change every time a new channel is established. Compared to the alignment procedure for single lane channels, multi-lane alignment is quite complex, and the hardware to perform it is significantly larger and more complicated. As a result, instrumenting the alignment logic to track the path of reference blocks through the alignment logic all the way to the estimator engine is difficult and costly.

To solve the problem of complex alignment logic, whenever a reference block arrives from one of the transceivers at the RX PCS alignment block, system 100 can be configured to capture VL_OFFSET data after the link is fully aligned and established. After the link is fully aligned, the delays for all of the virtual lanes, in terms of valid cycles, are frozen. If the delay of all the lanes were to change, data would be lost or there would be a gap in data because the MAC expects data on every valid cycle. If the delay of any of the lanes were to change without the others changing, data would be corrupted because the effective order of the data blocks that were sent from the other node would change. The RX PCS has a limited set of state bits that determine the delay for each virtual lane. The state bits determine the bit-interleave order of the lanes, the amount of bit level delay applied per virtual lane to align incoming data, the amount of delay applied per virtual lane to cancel out skew compared to the other virtual lanes. This is related to the current expected position of the alignment marker for each virtual lane and the position the virtual lane should take after lane re-ordering. Some of the state bits are static and do not change value after alignment is complete, while other are dynamic and change whenever a new block of data arrives in the virtual lane. The combination of dynamic state bit parameters has a 1:1 mapping to individual block positions between alignment markers. In other words, when a block arrives, each virtual lane must know how far that block is from the next alignment marker so the position of the block within an alignment marker period can be extracted by processing the dynamic state bits. Whenever a new reference block arrives at the receive (RX) PCS after alignment is complete, the system can take a snapshot of the alignment state bits for all the virtual lanes receiving data and make it available for processing in the fabric.

The term "local virtual lanes" includes RX PCS logic modules that perform virtual lane alignment. The term "remote virtual lanes" includes the virtual lane streams that were sent by the remote link partner. The RX PCS can be configured to use the local virtual lanes to align the remote virtual lane data and present the remote virtual lane data to the estimator engine in the original remote virtual lane order. The order of the remote virtual lanes is dictated by the Ethernet Standard.

In 40G, 50G, and 100G Ethernet, each remote virtual lane periodically sends an alignment marker that includes a code indicating the identification of the virtual lane. The alignment markers allow the system to determine skew between lanes and allow the system to identify the remote virtual lanes so the system can put them in the right order. The location of the alignment of the alignment markers is also passed to the estimator engine, so that the estimator engine knows when they occurred. After the RX PCS has completed all of its alignment operations, the alignment markers will always arrive in a contiguous group (e.g., a contiguous group of twenty). The alignment marker positions let the system identify the virtual lanes that follow them. If the contiguous group is a group of twenty, the blocks that are n×20 blocks after a given alignment marker belong to its virtual lane. The alignment markers show up periodically, for example, for 100G channels, the alignment markers appear every 81,915 valid cycles. The data is collected for each of the local virtual lanes (e.g., twenty lanes) and a VL_OFFSET value can be calculated for each remote virtual lane and loaded to a lookup table in the estimator engine.

The alignment markers for each lane can be treated as reference blocks. Each alignment marker is loaded with a TAM value (if there are only 4 physical lanes, there are only 4 TAM values, and they are used multiple times). The relationship between each physical lane and an associated remote virtual lane is recorded so the correct TAM can be assigned to each physical lane. The final VL_OFFSET value calculated for each remote virtual lane is the difference in arrival time between the alignment marker for the lane (the new reference block) and the reference block that produced the TAM value. For example, if the alignment marker for a virtual lane arrived at the same time as the reference block for its physical lane, its vl_offset would be zero. If it arrived thirty bits later, its offset would be +30*RX_UI Note that the virtual lane interleaving also changes the way the time between alignment markers (the new reference blocks) and data in each virtual lane is calculated. Data in each virtual lane recurs every vl_count×bits_per_block× RX_UI ns, which for twenty virtual lanes that have sixty-six bits per block, is 330×RX_UI. To calculate the second block in that virtual lane, the system would add 2*330*RX_UI etc.

Turning to the infrastructure of FIG. 1, system 100 in accordance with an example embodiment is shown. Generally, system 100 may be implemented in any type or topology of networks. Network 104 represents a series of points or nodes of interconnected communication paths for receiving and transmitting packets of information that propagate through system 100. Network 104 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, network elements 102a-102d, are meant to encompass network elements, network appliances, servers, routers, switches, gateways, bridges, load balancers, processors, modules, or any other suitable device, component, element, or object operable to exchange information in a network environment. Network elements 102a-102d may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of network elements 102a-102d may be virtual or include virtual elements.

In regards to the internal structure associated with system 100, each of network elements 102a-102d can include memory elements (e.g., memory 108) for storing information to be used in the operations outlined herein. Each of network elements 102a-102d may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media or machine-readable media. In some of these instances, memory elements can store data used for the operations described herein. This includes the memory elements being able to store software, logic, code, or processor instructions that are executed to carry out the activities described herein.

In an example implementation, elements of system 100, such as network elements 102a-102d may include software modules (e.g., timestamp engine 116, monitor engine 120, estimator engine 126, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 102a-102d may include one or more processors (e.g., processor 110) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Figure 2:
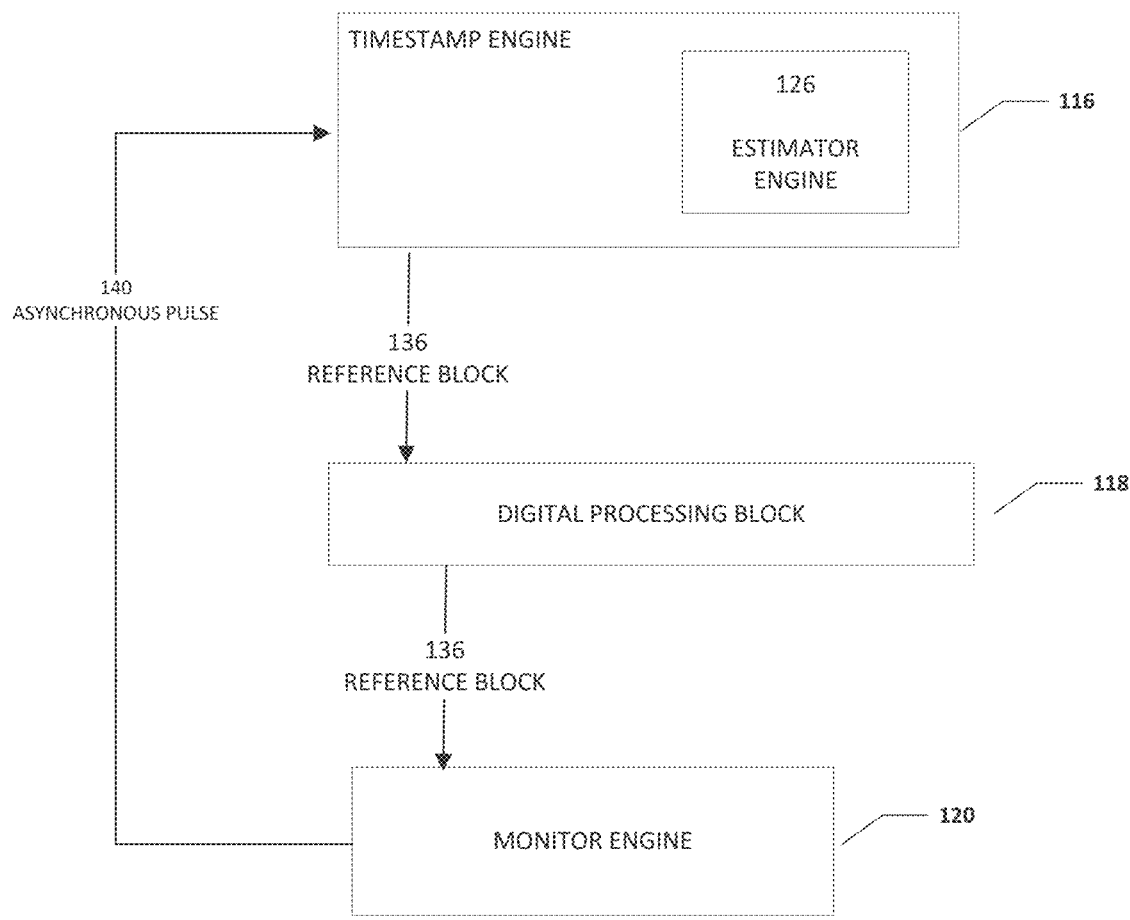
FIG. 2 is a block diagram of a portion of a system to enable generating a timestamp, in accordance with an embodiment of the present disclosure.

Turning to FIG. 2, FIG. 2 is a simplified block diagram of a portion of network element 102a. In an example, for egress communications that need a timestamp, timestamp engine 116 can communicate a reference block 136 to monitor engine 120. Reference block 136 may be generated by timestamp engine 116 or may be part of egress data flowing out of network element 102a. Reference block 136 can pass through digital processing block 118 where it is processed to be sent out of network element 102a. In response to monitor engine 120 receiving reference block 136, monitor engine 120 communicates an asynchronous pulse 140 back to timestamp engine 116 on a return path. The time for asynchronous pulse 140 to travel on the return path is measured by a calibration circuit so it is known. Using the time it took for timestamp engine 116 to communicate reference block 136 and then to receive asynchronous pulse 140, timestamp engine 116 can subtract the known return path time and determine how long reference block 136 took to travel to monitor engine 120. The time it took reference block 136 to travel to monitor engine 120 or how long it took reference block to reach the last block is the TAM. Estimator engine 126 uses the TAM to generates egress timestamps for data. Estimator engine 126 can be configured to generate content using the IEEE 1588 protocol.

Figure 3:
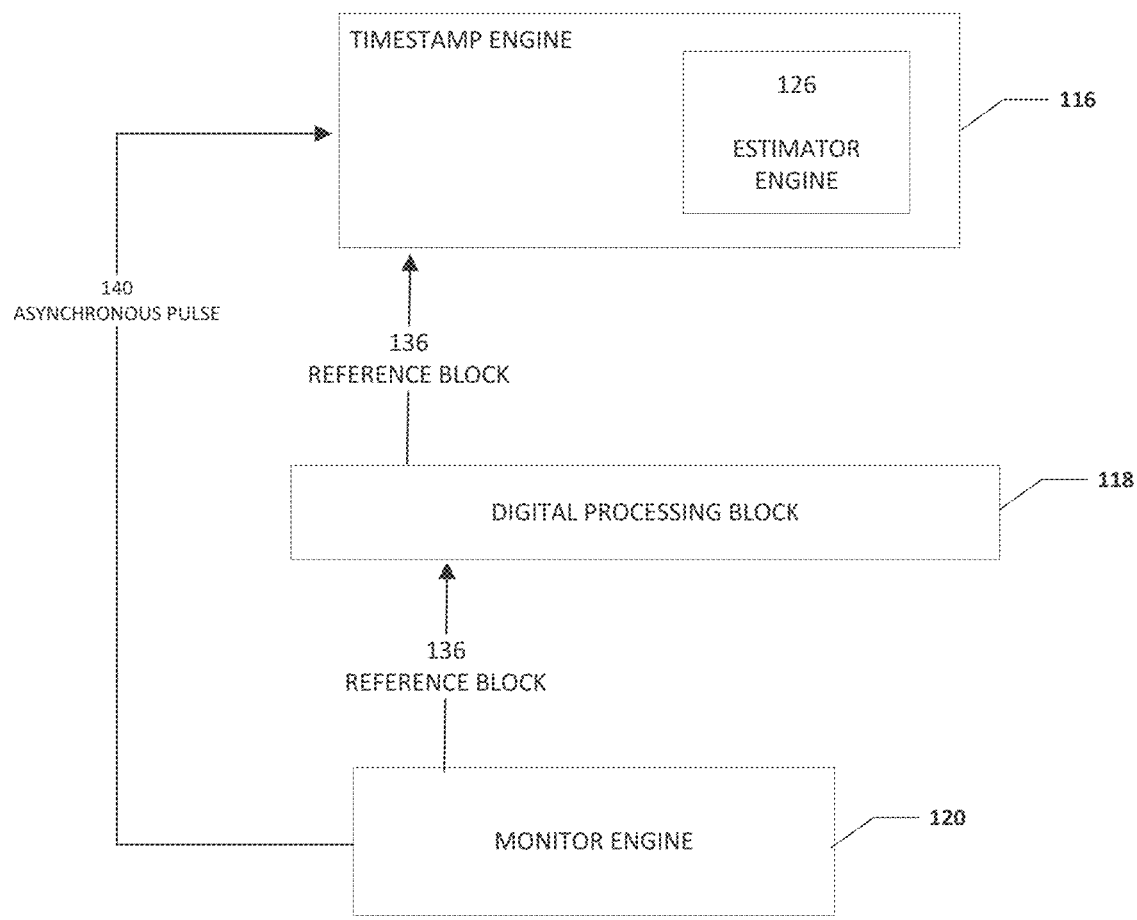
FIG. 3 is a block diagram of a portion of a system to enable generating a timestamp, in accordance with an embodiment of the present disclosure.

Turning to FIG. 3, FIG. 3 is a simplified block diagram of a portion of network element 102a. In an example, monitor engine 120 can receive ingress communications that need a timestamp and monitor engine 120 can communicate reference block 136 to timestamp engine 116. Reference block 136 may be generated by monitor engine 120 or may be an arbitrary block of ingress data. Monitor engine 120 also communicate asynchronous pulse 140 to timestamp engine 116 on a return path. The time for asynchronous pulse 140 to travel on the return path is measured by a calibration circuit so it is known. Reference block 136 can pass through digital processing block 118 where it is processed and communicated to timestamp engine 116. Using the time between when timestamp engine 116 received asynchronous pulse 140 and then reference block 136, timestamp engine 116 can subtract the known return path time and determine how long reference block 136 took to travel to timestamp engine 116 from monitor engine 120. In an example, digital processing block 118 can include a serial in parallel out operation and the time it takes to perform the operation may be known and also subtracted from the time between when timestamp engine 116 received asynchronous pulse 140 and then reference block 136. Estimator engine 126 can use the determined time to generate an egress timestamps for a packet or data.

Figure 4:
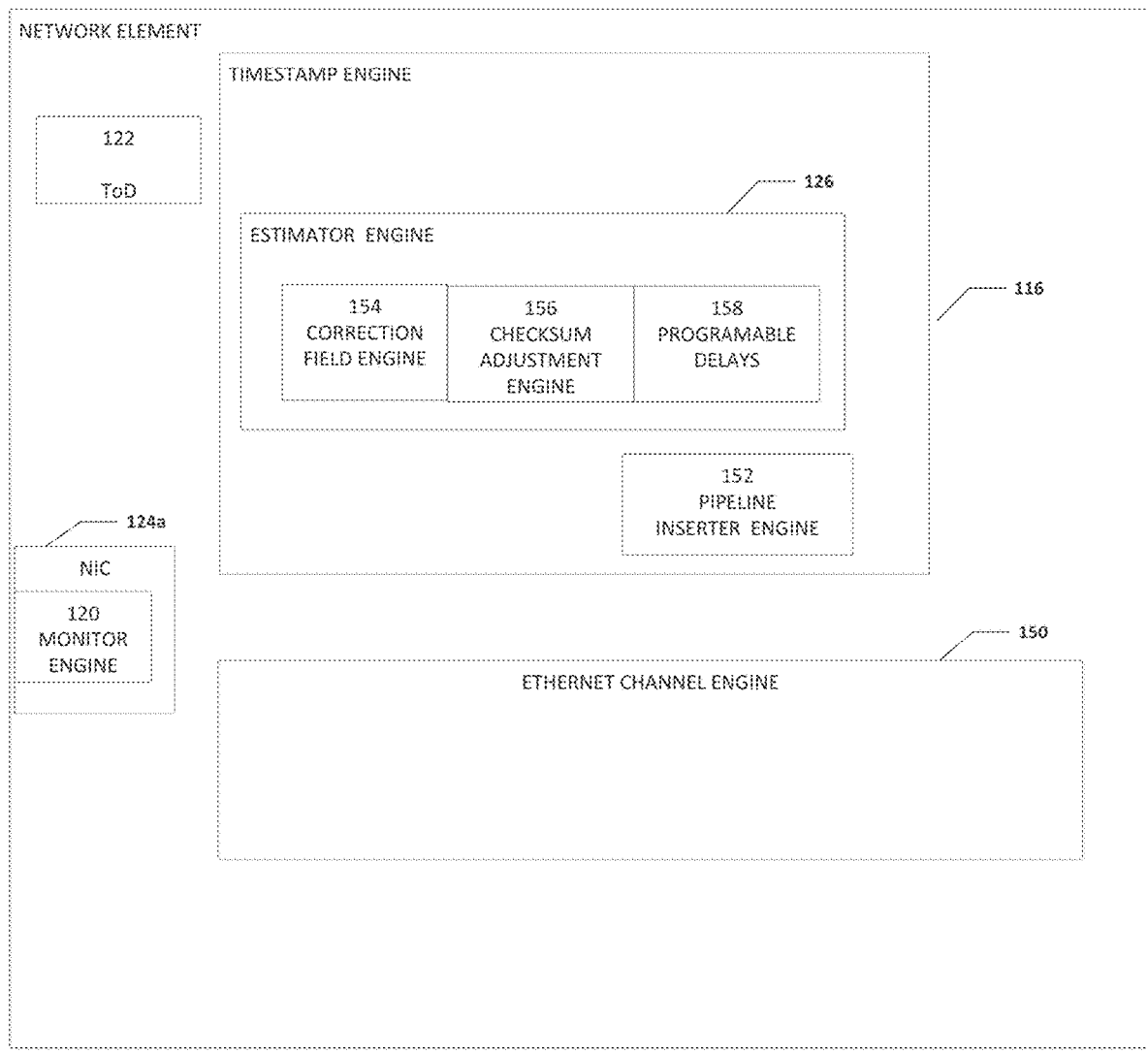
FIG. 4 is a block diagram of a portion of a system to enable generating a timestamp, in accordance with an embodiment of the present disclosure.

Turning to FIG. 4, FIG. 4 is a simplified block diagram of a portion of network element 102a. In an example, network element 102a can include timestamp engine 116. ToD 122. NIC 124a, and an Ethernet channel engine 150. Ethernet channel engine 150 can be configured to help communicate Ethernet packets to and from network element 102a and handle most if not all of the standard Ethernet operations. In an example, monitor engine 120 can be included in NIC 124a. Timestamp engine 116 can include estimator engine 126 and a pipeline engine 152. Pipeline engine 152 can be configured to insert 1-step and 2-step timestamps into data flowing through Ethernet channel engine 150. ToD 122 can be configured as a ToD clock to track the time of a grandmaster clock. ToD 122 can be a counter that increments in steps of fractions of a nano-second to track the time.

Estimator engine 126 can include a correction field engine 154, a checksum adjustment engine 156, and programable delays 158. Correction field engine 154 can be configured to provide a correction field that can indicate how long a packet was in transit in a system or network element (e.g., network element 102a). If a packet was passing through network element 102a, correction field engine 154 can provide information on how long or the time it took for the packet to pass through network element 102a. Checksum adjustment engine 156 can be configured to insert an extension bit, correction, or "cancellation" of changes made to a checksum field in a packet (e.g., checksums from IPv6 UDP packets). Programable delays 158 can include any delays related to sections of a data path that cannot be measured or monitored directly. Programable delays 158 includes fixed delays of the system that can be written in as constants. For example, the system may serialize received data but after the data is serialized, it is later transmitted as an optical signal. The time for the optical conversion can be included as a written constant in programable delays 158.

Figure 5:
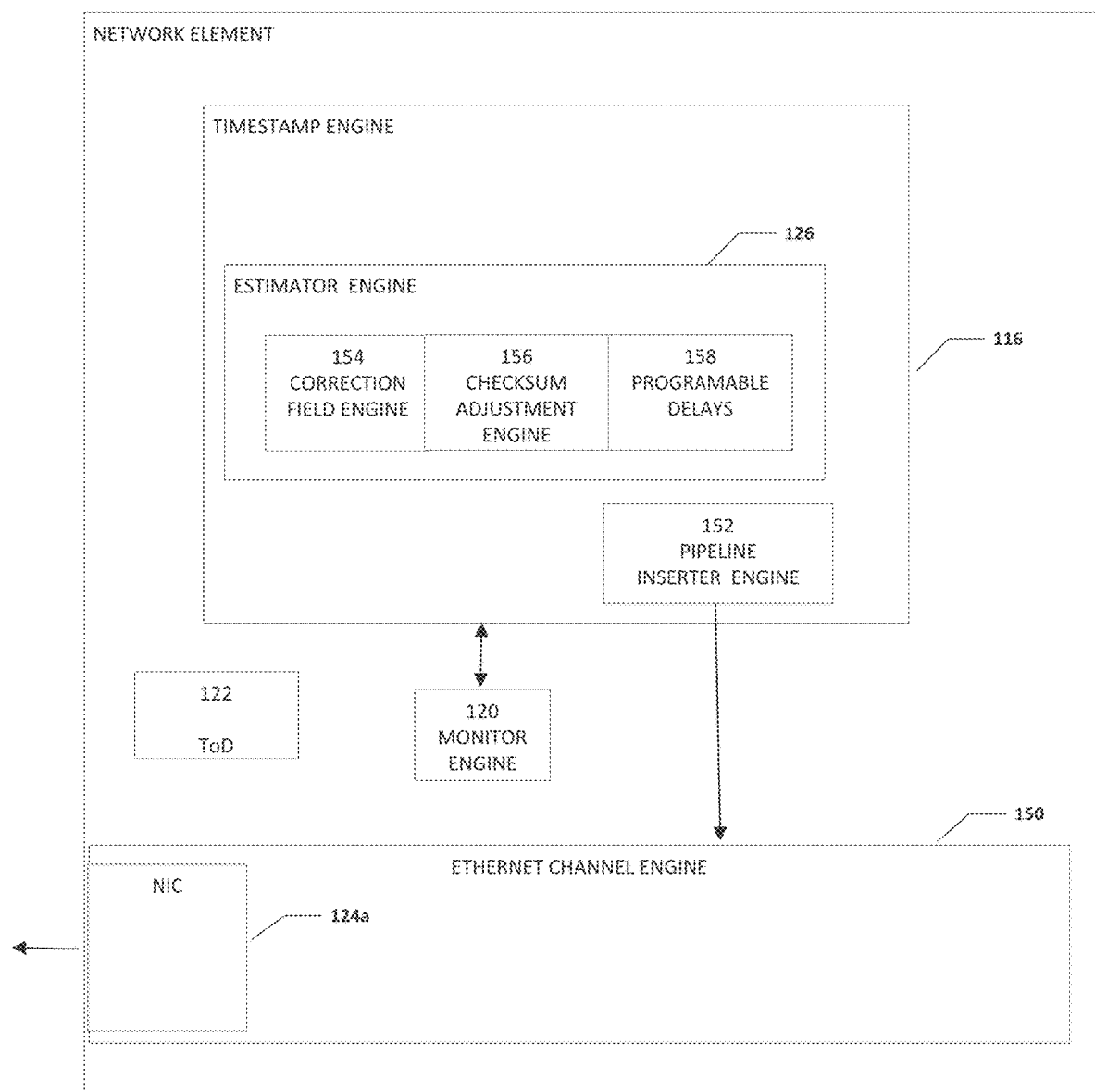
FIG. 5 is a block diagram of a portion of a system to enable generating a timestamp, in accordance with an embodiment of the present disclosure.

Turning to FIG. 5, FIG. 5 is a simplified block diagram of a portion of network element 102a. In an example, when a packet is sent from network element 102a, a timestamp is calculated for the packet. The packet does not need a correction field updated or need to have a checksum adjustment and neither correction field engine 154 or checksum adjustment engine 156 are used and system 100 can determine a timestamp for the packet as described with reference to FIG. 2.

Figure 6:
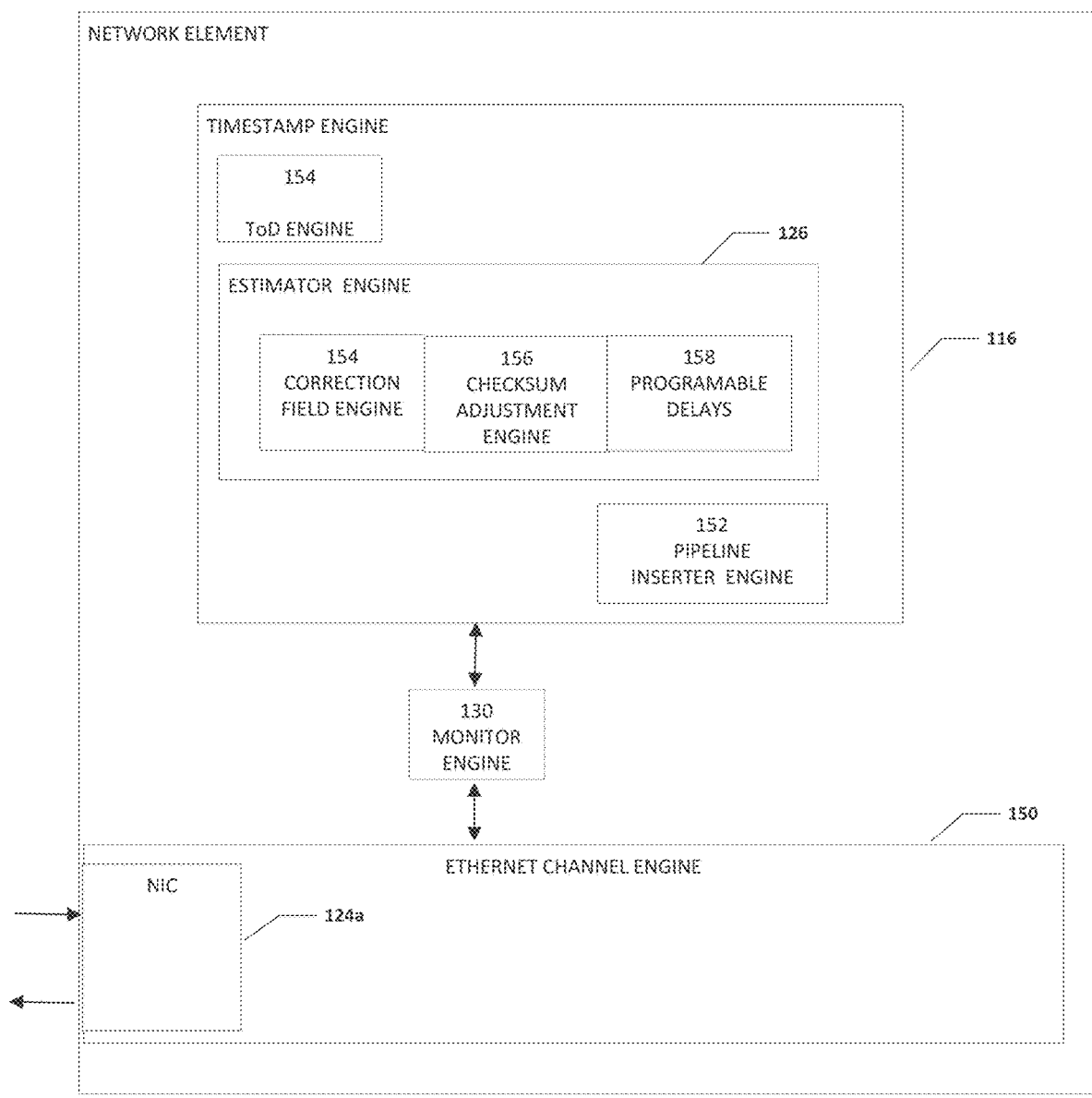
FIG. 6 is a block diagram of a portion of a system to enable generating a timestamp, in accordance with an embodiment of the present disclosure.

Turning to FIG. 6, FIG. 6 is a simplified block diagram of a portion of network element 102a. In an example, when a packet is received by network element 102a, if the packet does not need, is not associated, or otherwise does not have something do to with a timestamp, then the packet passes through Ethernet channel engine 150 without going to timestamp engine 116 or monitor engine 120. If the packet does need or is otherwise associated with a timestamp, the monitor engine sends the packet to timestamp engine. If it is a 1-step timestamp, the timestamp is inserted into the packet using estimator engine 121. If it is a 2-step packet, a timestamp is calculated and the timestamp is sent after the packet is sent.

Turning to FIG. 7, FIG. 7 is a simplified block diagram illustrating examples details of a portion of of a packet that may be used in system 100. In an example, a packet 160 can include a header portion 162 and a payload portion 164. Header portion 162 can include header information (e.g., a source identifier, a destination identifier, type, etc.) for packet 160. In an example, if packet 160 is an Ethernet packet, header portion 162 can include a MAC destination address, a MAC source address, packet type identifier, etc.

Payload portion 164 can include parameter data to help calculate offset values. For example, payload portion 164 can include a gearbox state portion 166, a block aligner phase portion 168, a block aligner position portion 170, an alignment marker count portion 172, a local virtual lane index number portion 174, a remote virtual lane index number portion 176, and a local physical lane index number portion 178. Gearbox state portion 166 can be used to determine the offset of bits delivered to the per virtual lane bit aligner compared to bit zero of the sync pulse block. Block aligner phase portion 168 can be used to determine what set of bits the block aligner was operating on when the synchronization block arrived to calculate the full offset to be applied. For example, if the block aligner is twenty-two bits wide operating over sixty-six bits, block aligner phase portion 168 can tract which set of twenty-two bits the block aligner was operating on when the synchronization block arrived to calculate the full sixty-six bites of offset applied. Block aligner position portion 170 can be used to determine how many bits of delay are applied by the block aligner to perform block alignment for a virtual lane. Block aligner position portion 170 can also be used to determine the relationship of bit zero of the data delivered by the gearbox to bit zero delivered by the block aligner. Alignment marker count portion 172 can be used to track the alignment marker count. The alignment marker count is the number of blocks since the last alignment marker arrived and is used to determine the offset between bit zero of the block from the block aligner and the alignment markers assigned to the virtual lane that includes packet 160. This allows the system to calculate a relationship between bit zero of a synchronization block and bit zero of the alignment marker. Local virtual lane index number portion 174 can be used to confirm that that data being received is from the correct virtual lane and can be used to determine which physical lane includes the synchronization block. Remote virtual lane index number portion 176 includes the index of the alignment markers of the virtual lane that includes packet 160. Local physical lane index number portion 178 indicates what physical lane is associated with the local virtual lane that includes packet 160.

Turning to FIG. 8, FIG. 8 is a block diagram of timestamp table 180 illustrating examples details of timestamps for reference bits arriving in virtual lanes. Timestamp table 180 can include virtual lane columns 182*a*-182*d*. Timestamp table 180 can include data that estimator engine 126 uses for each virtual lane, along with a TAM value for the lane, to calculate an ingress_timestamp for reference bits in each virtual lane. In an example, alignment markers for each lane are treated as reference blocks. Each alignment marker is loaded with a TAM value. In the illustrated example shown in FIG. 8, since there are only 4 physical lanes, there are only 4 TAM values and they are used multiple times. The system can keep track of which physical lane are associated with each remote virtual lane so the system can assign the correct TAM. A final VL_OFFSET value can be calculated for each remote virtual lane and the VL_OFFSET value is the difference in arrival time between the alignment marker for the lane (the new reference block) and the reference block that produced the TAM value. For example, if the alignment marker for a virtual lane arrived at the same time as the reference block for its physical lane, its vl_offset would be zero. If it arrived thirty bits later, its offset would be +30*RX_UI. Note that the virtual lane interleaving also changes the way the system would calculate the time between alignment markers (the new reference blocks) and the data in each virtual lane. Data in each virtual lane recurs every vl_count×bits_per_block×RX_UI nano seconds, which for twenty virtual lanes that have sixty-six bits per block, is 330×RX_UI, as illustrated in timestamp table 180. When the system wants to calculate the ingress timestamp for the first block of data after the alignment marker in VL3, the system can use the time from AM3 and add 330*RX_UI. To calculate the second block in that virtual lane, the system would add 2*330*RX_UI, etc.

Figure 9:
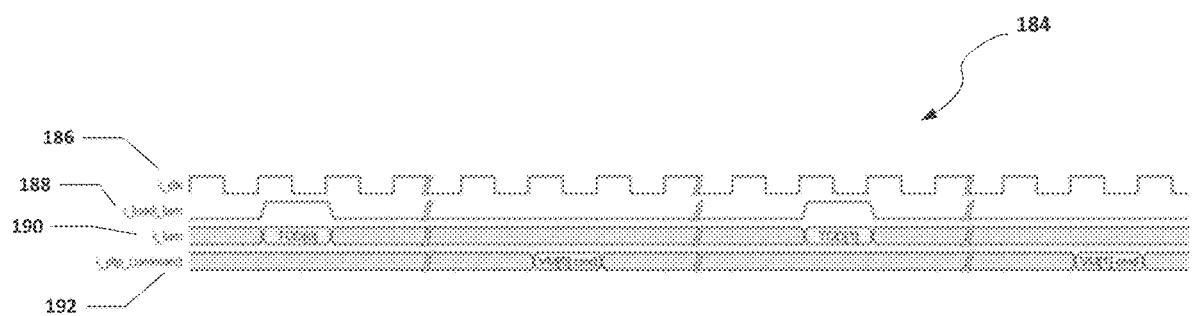
FIG. 9 is a block diagram of illustrating example details of generating a timestamp, in accordance with an embodiment of the present disclosure.

Turning to FIG. 9, FIG. 9 is a simplified block diagram illustrating examples details of a data flow 184 being used in system 100. In an example, data flow 184 can include a clock 186, a TAM load indicator 188, a TAM 190, and a PTP egress timestamp command 192 for ToD[1]. To virtualize the ToD, the system can load a TAM referenced to the desired ToD before performing any timestamp operations that require the ToD. In the example illustrated in FIG. 9, a TAM referenced to ToD[0] is loaded in TAM 190, then a PTP egress timestamp (either 1-step or 2-step) is requested using a PTP command to the estimator engine for ToD[0]. Next, a TAM referenced to ToD[1] is loaded in TAM load indicator 188, followed by PTP egress timestamp command 192 for ToD[1]. Switching contexts between ToD clocks can be used for an arbitrary number of ToD clocks, so long as TAM can be converted from the ToD clock the system used to capture the original TAM of the reference block to any other ToD of interest. This assumes that the system is able to generate a sufficiently accurate corresponding time for each ToD clock, which is normally the case because, while the clocks are tracking different ToD values, if they are sharing the same channel they are usually being clocked by the same reference clock. The system can take its time performing the calculations, as long as the conversions can be performed correctly, and can delay the loading of TAM because the typical time limit for a TAM load is about 80,000 clock cycles. This means that TAM conversions can be performed using slower calculation methods. For example, TAM conversions can be performed using a microprocessor, and the results stored in timestamp table 180 until they are needed.

Figure 10:
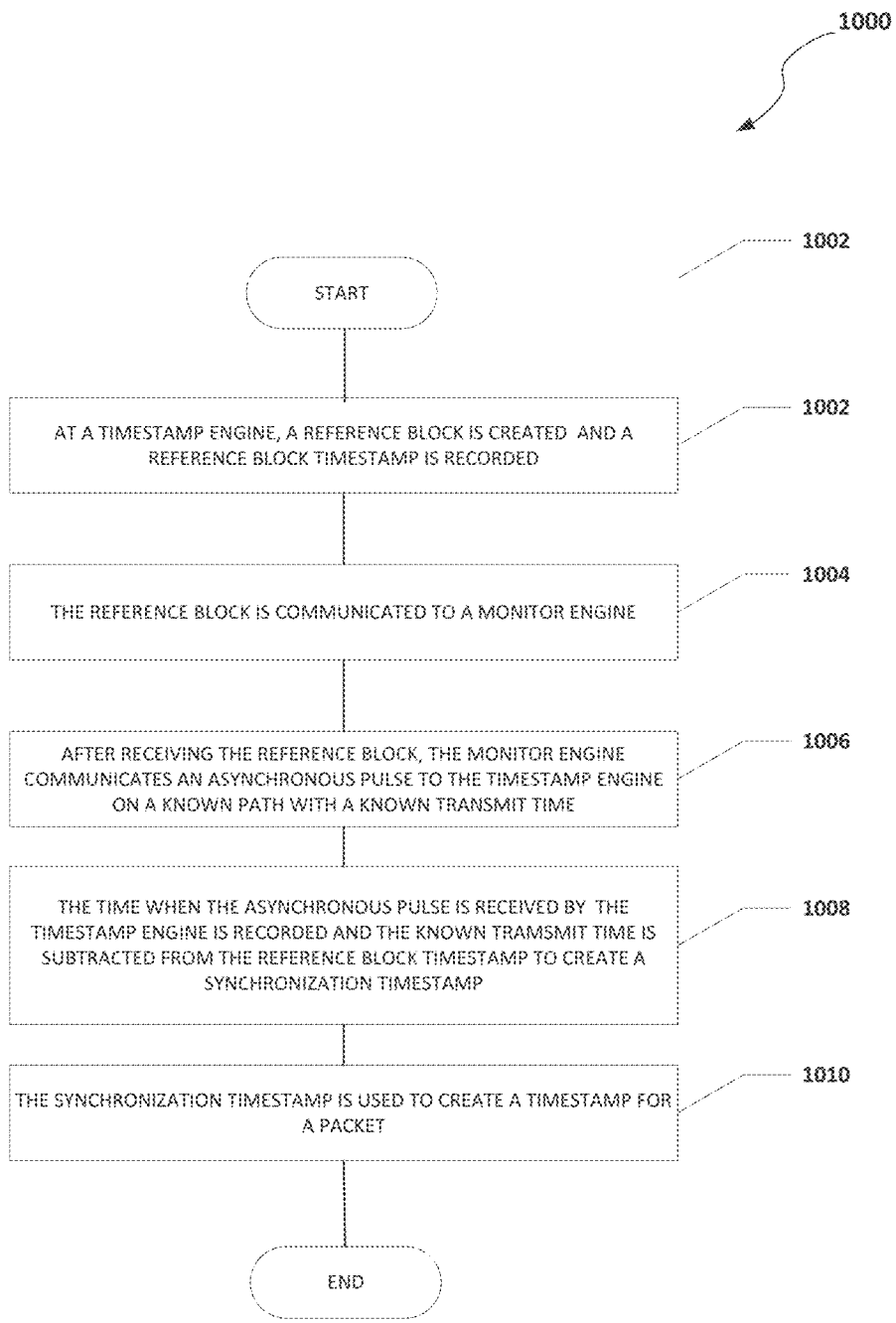
FIG. 10 is a flowchart illustrating potential operations that may be associated with the system in accordance with an embodiment.

Turning to FIG. 10, FIG. 10 is an example flowchart illustrating possible operations of a flow 1000 that may be associated with generating a timestamp, in accordance with an embodiment. In an embodiment, one or more operations of flow 1000 may be performed by timestamp engine 116, monitor engine 120, estimator engine 126, etc. At 1002, at a timestamp engine, a reference block is created and a reference block timestamp is recorded. In an example, a block of data proximate to the packet is determined to be the reference block. In another example, arbitrary blocks can be chosen to be reference blocks. In yet another example, special symbols from the Ethernet protocol can be selected to be reference blocks (for example, FEC alignment markers). At 1004, the reference block is communicated to a monitor engine. At 1006, after receiving the reference block, the monitor engine communicates an asynchronous pulse to the timestamp engine on a known path with a known transmit time. At 1008, the time when the asynchronous pulse is received by the timestamp engine is recorded and the known transmit time is subtracted from the reference block timestamp to create a synchronization timestamp. At 1010, the synchronization timestamp is used to create a timestamp for a packet. In an example, the synchronization timestamp can be used repeatedly for a plurality of packets to create a timestamp for each of the plurality of packets.

Figure 11:
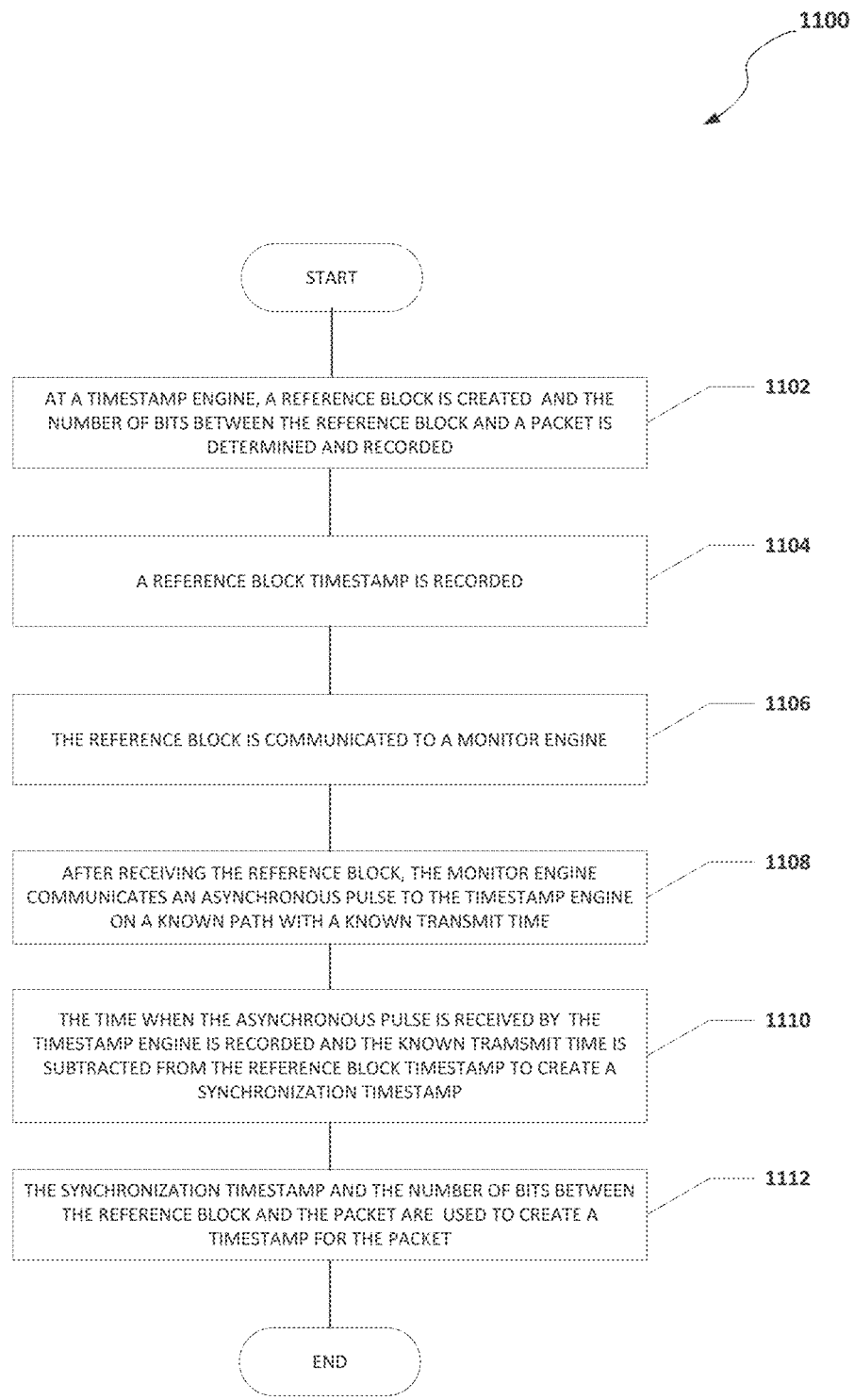
FIG. 11 is a flowchart illustrating potential operations that may be associated with the system in accordance with an embodiment.

Turning to FIG. 11, FIG. 11 is an example flowchart illustrating possible operations of a flow 1100 that may be associated with generating a timestamp, in accordance with an embodiment. In an embodiment, one or more operations of flow 1100 may be performed by timestamp engine 116, monitor engine 120, estimator engine 126, etc. At 1102, at a timestamp engine, a reference block is created and the number of bits between a reference block and the packet is determined and recorded. In an example, a block of data proximate to the packet is determined to be the reference block. In another example, arbitrary blocks can be chosen to be reference blocks. In yet another example, special symbols from the Ethernet protocol can be selected to be reference blocks (for example, FEC alignment markers). At 1104, a reference block timestamp is recorded. At 1106, the reference block is communicated to a monitor engine. At 1108, after receiving the reference block, the monitor engine communicates an asynchronous pulse to the timestamp engine on a known path with a known transmit time. At 1110, the time when the asynchronous pulse is received by the timestamp engine is recorded and the known transmit time is subtracted from the reference block timestamp to create a synchronization timestamp. At 1112, the synchronization timestamp and the number of bits between the reference block and the packet are used to create a timestamp for the packet. In an example, the synchronization timestamp can be used repeatedly for a plurality of packets to create a timestamp for each of the plurality of packets. For example, the synchronization timestamp can be determined. Then, for each packet that needs a timestamp, the number of bits between the reference block and the packet can be determined and the synchronization timestamp and the number of bits between the reference block and the packet can be used to create a timestamp for the packet.

Figure 12:
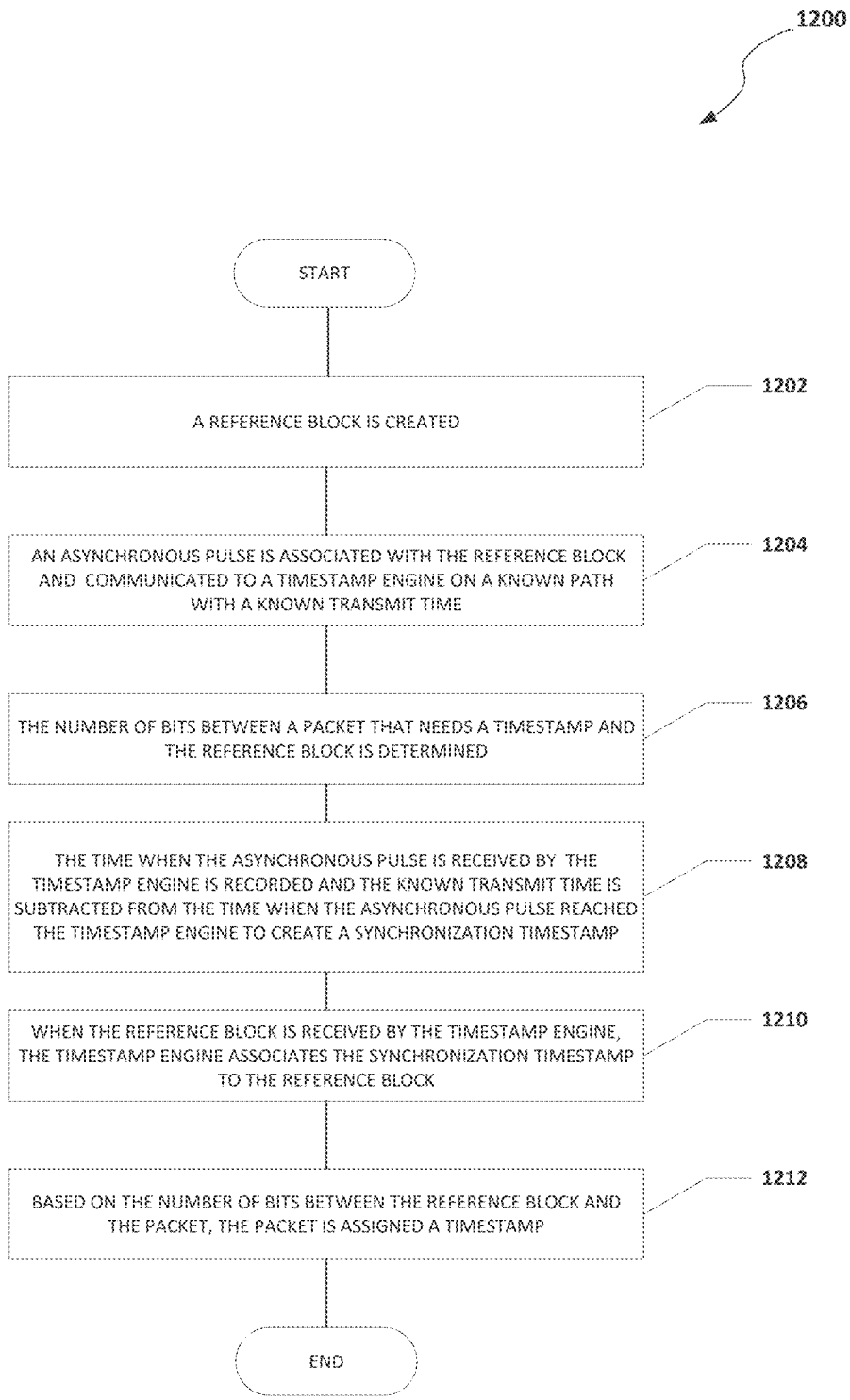
FIG. 12 is a flowchart illustrating potential operations that may be associated with the system in accordance with an embodiment.

Turning to FIG. 12, FIG. 12 is an example flowchart illustrating possible operations of a flow 1200 that may be associated with generating a timestamp, in accordance with an embodiment. In an embodiment, one or more operations of flow 1200 may be performed by timestamp engine 116, monitor engine 120, estimator engine 126, etc. At 1202, a reference block is created. In an example, a block of data proximate to the packet is determined to be the reference block. In one mode, monitor engine 120 uses a free-running counter to pick arbitrary blocks of data to be reference blocks at the chosen period. In a second mode, monitor engine 120 does the same, but the relationship between the asynchronous pulse and the reference block is adjusted so that the resulting asynchronous pulse corresponds to the start of an Ethernet RSFEC block. In the second mode, monitor engine 120 can shift the position of the reference block marker so that it lands on the corresponding RSFEC alignment block. At 1204, an asynchronous pulse is associated with the reference block and communicated to a timestamp engine on a known path with a known transmit time. At 1206, the number of bits between a packet that needs a timestamp and the reference block is determined. At 1208, the time when the asynchronous pulse is received by the timestamp engine is recorded and the known transmit time is subtracted from the time when the asynchronous pulse reached the timestamp engine to create a synchronization timestamp. At 1210, when the reference block is received by the timestamp engine, the timestamp engine associates the synchronization timestamp to the reference block. At 1212, based on the number of bits between the reference block and the packet, the packet is assigned a timestamp. In an example, the synchronization timestamp can be used repeatedly for a plurality of packets to create a timestamp for each of the plurality of packets. For example, the synchronization timestamp can be determined. Then, for each packet that needs a timestamp, the number of bits between the reference block and the packet can be determined and the synchronization timestamp and the number of bits between the reference block and the packet can be used to create a timestamp for the packet.

Figure 13:
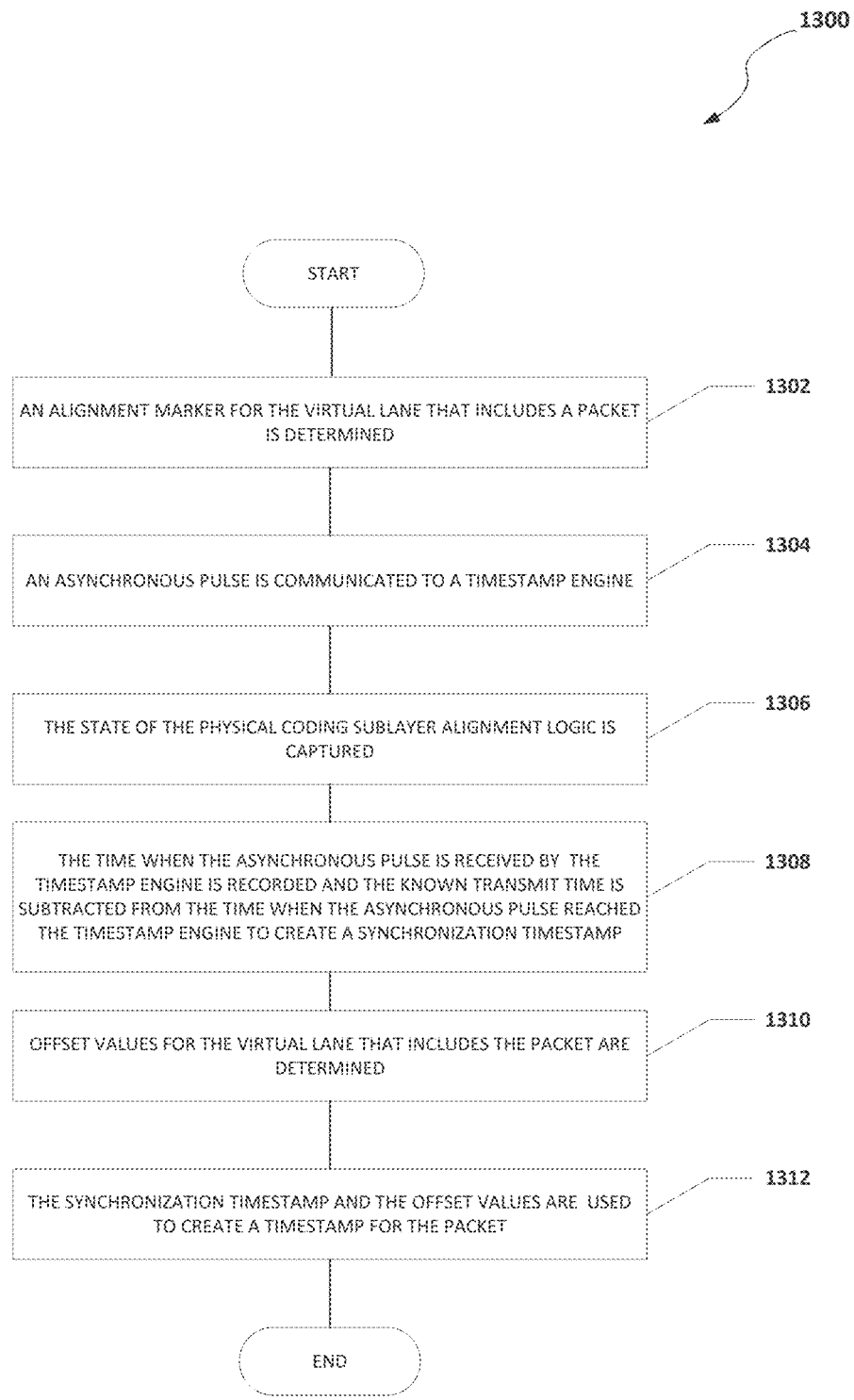
FIG. 13 is a flowchart illustrating potential operations that may be associated with the system in accordance with an embodiment.

Turning to FIG. 13, FIG. 13 is an example flowchart illustrating possible operations of a flow 1300 that may be associated with generating a timestamp, in accordance with an embodiment. In an embodiment, one or more operations of flow 1300 may be performed by timestamp engine 116, monitor engine 120, estimator engine 126, etc. At 1302, an alignment marker for the virtual lane that includes a packet is determined. At 1304, an asynchronous pulse is communicated to a timestamp engine. At 1306, the state of the physical coding sublayer alignment logic is captured. The reason the state of the physical coding sublayer alignment logic is capture is to ensure that the data_valid is constantly high and the latency between the monitor engine and the reference plane is fixed and constant. At 1308, the time when the asynchronous pulse is received by the timestamp engine is recorded and the known transmit time is subtracted from the time when the asynchronous pulse reached the timestamp engine to create a synchronization timestamp. At 1310, offset values for the virtual lane that included the packet are determined. At 1312, the synchronization timestamp and the offset values are used to create a timestamp for the packet. In an example, the synchronization timestamp can be used repeatedly for a plurality of packets to create a timestamp for each of the plurality of packets. For example, the synchronization timestamp can be determined. Then, for each packet that needs a timestamp, the offset value for that packet can be determined and the synchronization timestamp and the offset value for the packet can be used to create a timestamp for the packet.

Figure 14:
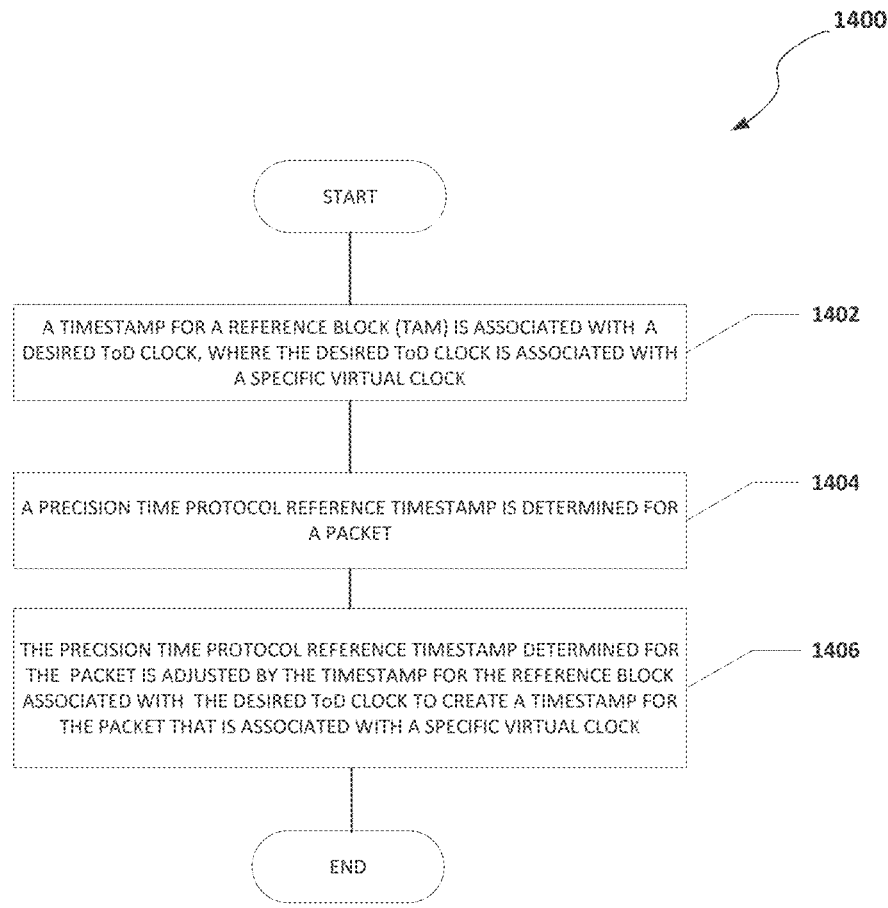
FIG. 14 is a flowchart illustrating potential operations that may be associated with the system in accordance with an embodiment.

Turning to FIG. 14, FIG. 14 is an example flowchart illustrating possible operations of a flow 1400 that may be associated with generating a timestamp, in accordance with an embodiment. In an embodiment, one or more operations of flow 1400 may be performed by timestamp engine 116, monitor engine 120, estimator engine 126, etc. At 1402, a timestamp for a reference block (e.g., TAM) is associated with a desired ToD clock, where the desired ToD clock is associated with a specific virtual clock. At 1404, a precision time protocol reference timestamp is determined for a packet. At 1406, the precision time protocol reference timestamp determined for the packet is adjusted by the timestamp for the reference block (TAM) associated with the desired ToD clock to create a timestamp for the packet that is associated with the specific virtual clock.

It is also important to note that the operations in the preceding flow diagrams (i.e., FIGS. 10-14) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although system 100 have been illustrated with reference to particular elements and operations that facilitate the communication process, these elements and operations may be replaced by any suitable architecture, protocols, and/or processes that achieve the intended functionality of system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable medium having one or more instructions that when executed by at least one processor, cause the at least one processor to determine an initial timestamp for a reference block, communicate the reference block to a monitor engine, receive an asynchronous pulse from the monitor engine after the monitor engine received the reference block, determine a synchronization timestamp for the asynchronous pulse, and determine a timestamp for a packet based on the initial timestamp for the reference block and the synchronization timestamp for the asynchronous pulse.

In Example C2, the subject matter of Example C1 can optionally include where the one or more instructions further cause the at least one processor to subtract a known transmit time of the asynchronous pulse from a time when the asynchronous pulse was received to determine the synchronization timestamp.

In Example C3, the subject matter of any one of Examples C1-C2 can optionally include where the one or more instructions further cause the at least one processor to determine a number of bits between the reference block and the packet, where the determined timestamp for the packet is also based on the number of bits between the reference block and the packet.

In Example C4, the subject matter of any one of Examples C1-C3 can optionally include where a path of the reference block goes through a digital processing block.

In Example C5, the subject matter of any one of Examples C1-C4 can optionally include where the monitor engine is below a digital processing block.

In Example C6, the subject matter of any one of Examples C1-C5 can optionally include where the packet is from a virtual machine.

In Example C7, the subject matter of any one of Examples C1-C6 can optionally include where the timestamp is a 1-step timestamp or a 2-step timestamp.

In Example A1, an electronic device can include memory, a timestamp engine, and at least one processor. The timestamp engine is configured to cause the at least one processor to determine an initial timestamp for a reference block, communicate the reference block to a monitor engine, receive an asynchronous pulse from the monitor engine after the monitor engine received the reference block, determine a synchronization timestamp for the asynchronous pulse, and determine a timestamp for a packet based on the initial timestamp for the reference block and the synchronization timestamp for the asynchronous pulse.

In Example A2, the subject matter of Example A1 can optionally include where the timestamp engine is further configured to cause the least one processor to subtract a known transmit time of the asynchronous pulse from a time when the asynchronous pulse was received to determine the synchronization timestamp.

In Example A3, the subject matter of any one of Examples A1-A2 can optionally include where the communication engine is further configured to cause the least one processor to determine a number of bits between the reference block and the packet, where the determined timestamp for the packet is also based on the number of bits between the reference block and the packet.

In Example A4, the subject matter of any one of Examples A1-A3 can optionally include where a path of the reference block goes through a digital processing block.

In Example A5, the subject matter of any one of Examples A1-A4 can optionally include where the asynchronous pulse has a fixed latency.

Example M1 is a method including determining an initial timestamp for a reference block, communicating the reference block to a monitor engine, receiving an asynchronous pulse from the monitor engine after the monitor engine received the reference block, determining a synchronization timestamp for the asynchronous pulse, and determining a timestamp for a packet based on the initial timestamp for the reference block and the synchronization timestamp for the asynchronous pulse.

In Example M2, the subject matter of Example M1 can optionally include subtracting a known transmit time of the asynchronous pulse from a time when the asynchronous pulse was received to determine the synchronization timestamp.

In Example M3, the subject matter of any one of the Examples M1-M2 can optionally include determining a number of bits between the reference block and the packet, where the determined timestamp for the packet is also based on the number of bits between the reference block and the packet.

In Example M4, the subject matter of any one of the Examples M1-M3 can optionally include where a path of the reference block goes through a digital processing block.

In Example M5, the subject matter of any one of the Examples M1-M4 can optionally include where the asynchronous pulse has a fixed latency.

In Example M6, the subject matter of any one of Examples M1-M5 can optionally include where the timestamp is a 1-step timestamp or a 2-step timestamp.

Example S1 is a system for generating a timestamp. The system can include memory, one or more processors, and a timestamp engine. The timestamp engine is configured to determine an initial timestamp for a reference block, communicate the reference block to a monitor engine, receive an asynchronous pulse from the monitor engine after the monitor engine received the reference block, determine a synchronization timestamp for the asynchronous pulse, and determine a timestamp for a packet based on the initial timestamp for the reference block and the synchronization timestamp for the asynchronous pulse.

In Example S2, the subject matter of Example S1 can optionally include where the timestamp engine is further configured to subtract a known transmit time of the asynchronous pulse from a time when the asynchronous pulse was received to determine the synchronization timestamp.

In Example S3, the subject matter of any one of the Examples S1-S2 can optionally include where the timestamp engine is further configured to determine a number of bits between the reference block and the packet, where the determined timestamp for the packet is also based on the number of bits between the reference block and the packet.

In Example S4, the subject matter of any one of the Examples S1-S3 can optionally include where a path of the reference block goes through a a digital processing block.

In Example S5, the subject matter of any one of the Examples S1-S4 can optionally include where the asynchronous pulse has a fixed latency.

In Example S6, the subject matter of any one of the Examples S1-S5 can optionally include where the packet is from a virtual machine.

In Example S7, the subject matter of any one of the Examples S1-S6 can optionally include where the timestamp is a 1-step timestamp or a 2-step timestamp.

Example AA1 is an apparatus including means for determining an initial timestamp for a reference block, means for communicating the reference block to a monitor engine, means for receiving an asynchronous pulse from the monitor engine after the monitor engine received the reference block, means for determining a synchronization timestamp for the asynchronous pulse, and means for determining a timestamp for a packet based on the initial timestamp for the reference block and the synchronization timestamp for the asynchronous pulse.

In Example AA2, the subject matter of Example AA1 can optionally include means for subtracting a known transmit time of the asynchronous pulse from a time when the asynchronous pulse was received to determine the synchronization timestamp.

In Example AA3, the subject matter of any one of Examples AA1-AA2 can optionally include means for determining a number of bits between the reference block and the packet, where the determined timestamp for the packet is also based on the number of bits between the reference block and the packet.

In Example AA4, the subject matter of any one of Examples AA1-AA3 can optionally include where a path of the reference block goes through a digital processing block.

In Example AA5, the subject matter of any one of Examples AA1-AA4 can optionally include where the monitor engine is below a digital processing block.

In Example AA6, the subject matter of any one of Examples AA1-AA5 can optionally include where the packet is from a virtual machine.

In Example AA7, the subject matter of any one of Examples AA1-AA6 can optionally include where the timestamp is a 1-step timestamp or a 2-step timestamp.

Example X1 is a machine-readable storage medium including machine-readable instructions to implement a method or realize an apparatus as in any one of the Examples A1-A5, AA1-AA7, or M1-M6. Example Y1 is an apparatus comprising means for performing any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that, when executed by at least one processor, causes the at least one processor to:
   determine an initial timestamp for a reference block;
   communicate the reference block to monitor circuitry;
   receive an asynchronous pulse generated by the monitor circuitry responsive to the monitor circuitry's receipt of the reference block communication;
   determine a synchronization timestamp for the asynchronous pulse;
   determine a number of bits between the reference block and a reference bit of a packet; and
   determine a timestamp for the packet based on the initial timestamp for the reference block, the synchronization timestamp for the asynchronous pulse, and the number of bits between the reference block and the reference bit of the packet.

2. The at least one non-transitory machine readable medium of claim 1, wherein the one or more instructions further cause the at least one processor to:
   subtract a known transmit time of the asynchronous pulse from a time when the asynchronous pulse was received to determine the synchronization timestamp.

3. The at least one non-transitory machine readable medium of claim 1, wherein a path of the reference block goes through a digital processing block.

4. The at least one non-transitory machine readable medium of claim 1, wherein the monitor circuitry engine is below a digital processing block.

5. The at least one non-transitory machine readable medium of claim 1, wherein the packet is from a virtual machine.

6. The at least one non-transitory machine readable medium of claim 1, wherein the timestamp is a 1-step timestamp or a 2-step timestamp.

7. An electronic device comprising:
   memory;
   timestamp circuitry; and
   at least one processor, wherein the timestamp circuitry is configured to cause the at least one processor to:
   determine an initial timestamp for a reference block;
   communicate the reference block to monitor circuitry;
   receive an asynchronous pulse generated by the monitor circuitry responsive to the monitor circuitry's receipt of the reference block communication;
   determine a synchronization timestamp for the asynchronous pulse;
   determine a number of bits between the reference block and a reference bit of a packet; and
   determine a timestamp for the packet based on the initial timestamp for the reference block, the synchronization timestamp for the asynchronous pulse, and the number of bits between the reference block and the reference bit of the packet.

8. The electronic device of claim 7, wherein the timestamp circuitry is further configured to cause the at least one processor to:
   subtract a known transmit time of the asynchronous pulse from a time when the asynchronous pulse was received to determine the synchronization timestamp.

9. The electronic device of claim 7, wherein a path of the reference block goes through a digital processing block.

10. The electronic device of claim 7, wherein the asynchronous pulse has a fixed latency.

11. A method comprising:
    determining an initial timestamp for a reference block;
    communicating the reference block to monitor circuitry;
    receiving an asynchronous pulse generated by the monitor circuitry responsive to the monitor circuitry's receipt of the reference block communication;
    determining a synchronization timestamp for the asynchronous pulse;
    determining a number of bits between the reference block and a reference bit of a packet; and
    determining a timestamp for the packet based on the initial timestamp for the reference block, the synchronization timestamp for the asynchronous pulse, and the number of bits between the reference block and the reference bit of the packet.

12. The method of claim 11, further comprising:
    subtracting a known transmit time of the asynchronous pulse from a time when the asynchronous pulse was received to determine the synchronization timestamp.

13. The method of claim 11, wherein a path of the reference block goes through a digital processing block.

14. The method of claim 11, wherein the asynchronous pulse has a fixed latency.

15. The method of claim 11, wherein the timestamp is a 1-step timestamp or a 2-step timestamp.

16. A system for generating a timestamp, the system comprising:
    memory;
    one or more processors; and
    timestamp circuitry, wherein the timestamp circuitry is configured to:
    determine an initial timestamp for a reference block;
    communicate the reference block to monitor circuitry;
    receive an asynchronous pulse generated by the monitor circuitry responsive to the monitor circuitry's receipt of the reference block communication;
    determine a synchronization timestamp for the asynchronous pulse;
    determine a number of bits between the reference block and a reference bit of a packet; and
    determine a timestamp for the packet based on the initial timestamp for the reference block, the synchronization timestamp for the asynchronous pulse, and the number of bits between the reference block and the reference bit of the packet.

17. The system of claim 16, wherein the timestamp circuitry is further configured to:
subtract a known transmit time of the asynchronous pulse from a time when the asynchronous pulse was received to determine the synchronization timestamp.

18. The system of claim 16, wherein a path of the reference block goes through a digital processing block.

19. The system of claim 16, wherein the asynchronous pulse has a fixed latency.

20. The system of claim 16, wherein the packet is from a virtual machine.

21. The system of claim 16, wherein the timestamp is a 1-step timestamp or a 2-step timestamp.

* * * * *

UNITED STATES PATENT AND TRADEMARK OFFICE
CERTIFICATE OF CORRECTION

PATENT NO. : 11,349,587 B2
APPLICATION NO. : 15/941422
DATED : May 31, 2022
INVENTOR(S) : Nigel Gulstone et al.

It is certified that error appears in the above-identified patent and that said Letters Patent is hereby corrected as shown below:

In the Claims

Column 25 Lines 53-55 Claim 4 should read:
The at least one non-transitory machine readable medium of claim 1, wherein the monitor circuitry is below a digital processing block.

Signed and Sealed this
Twenty-second Day of November, 2022

Katherine Kelly Vidal
Director of the United States Patent and Trademark Office